(12) United States Patent
McAllister et al.

(10) Patent No.: US 11,763,523 B2
(45) Date of Patent: Sep. 19, 2023

(54) COMPRESSED THIT STACK FOR HARDWARE-ACCELERATED GPU RAY TRACING

(71) Applicant: QUALCOMM Incorporated, San Diego, CA (US)

(72) Inventors: David Kirk McAllister, Holladay, UT (US); Francois Mathias Robert Demoullin, Vancouver (CA)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 17/650,069

(22) Filed: Feb. 4, 2022

(65) Prior Publication Data
US 2023/0252727 A1    Aug. 10, 2023

(51) Int. Cl.
| G06T 17/10 | (2006.01) |
| G06T 15/08 | (2011.01) |
| G06T 9/00  | (2006.01) |
| G06T 15/06 | (2011.01) |

(52) U.S. Cl.
CPC ............ *G06T 17/10* (2013.01); *G06T 9/001* (2013.01); *G06T 15/06* (2013.01); *G06T 15/08* (2013.01); *G06T 2210/21* (2013.01)

(58) Field of Classification Search
None
See application file for complete search history.

(56) References Cited

U.S. PATENT DOCUMENTS

| 11,593,990 | B1* | 2/2023 | Ramesh Babu | G06T 1/60 |
| 2013/0016109 | A1* | 1/2013 | Garanzha | G06T 15/06 |
|  |  |  |  | 345/543 |
| 2017/0249771 | A1* | 8/2017 | Obert | G06T 15/06 |
| 2017/0287203 | A1* | 10/2017 | Vaidyanathan | G06T 15/06 |
| 2020/0211268 | A1 | 7/2020 | Vaidyanathan et al. | |
| 2021/0287422 | A1* | 9/2021 | Saleh | G06T 15/005 |
| 2021/0287431 | A1 | 9/2021 | Woop et al. | |
| 2022/0051476 | A1* | 2/2022 | Woop | G06T 3/4007 |

OTHER PUBLICATIONS

International Search Report and Written Opinion—PCT/US2023/010517—ISA/EPO—dated May 9, 2023.

* cited by examiner

*Primary Examiner* — Nurun Flora
(74) *Attorney, Agent, or Firm* — Procopio, Cory, Hargreaves & Savitch LLP

(57) ABSTRACT

Aspects presented herein relate to methods and devices for graphics processing including an apparatus, e.g., a GPU or CPU. The apparatus may configure a BVH structure including a plurality of nodes, the BVH structure being associated with geometry data for a plurality of primitives in a scene. The apparatus may also detect a set of hit child nodes for a current node of the plurality of nodes. Further, the apparatus may sort the set of hit child nodes based on the parametric distance value of each of the set of hit child nodes. The apparatus may also compress the node ID and the parametric distance value for each of an updated set of hit child nodes based on the sorted set of hit child nodes. The apparatus may also store the compressed node ID and the compressed parametric distance value for each of the updated set of hit child nodes.

30 Claims, 14 Drawing Sheets

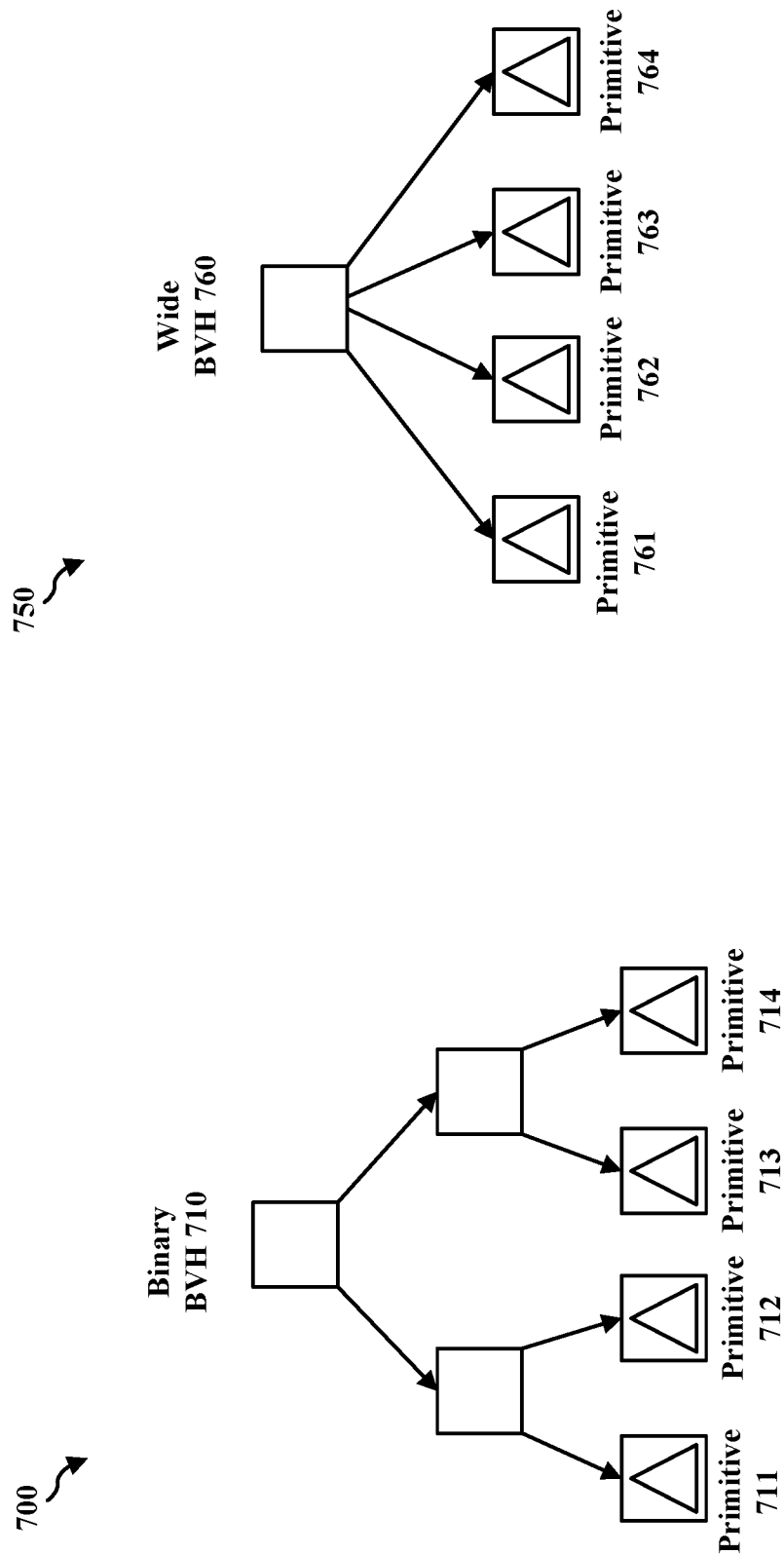

COMPRESSED THIT STACK FOR HARDWARE-ACCELERATED GPU RAY TRACING

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform graphics processing. The apparatus may configure a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). The apparatus may also detect a set of hit child nodes for a current node of the plurality of nodes, each of the set of hit child nodes being intersected by a current ray from a ray tracing process for the current node, each of the set of hit child nodes including a node ID and a parametric distance value. Additionally, the apparatus may sort the set of hit child nodes based on the parametric distance value of each of the set of hit child nodes. The apparatus may also identify the hit child node with the shortest parametric distance value in the set of hit child nodes. The apparatus may also exclude the hit child node with the shortest parametric distance value from the set of hit child nodes based on the identification of the hit child node with the shortest parametric distance value. Moreover, the apparatus may compress the node ID and the parametric distance value for each of an updated set of hit child nodes based on the sorted set of hit child nodes, the updated set of hit child nodes excluding the hit child node with a shortest parametric distance value in the set of hit child nodes. The apparatus may also store the compressed node ID and the compressed parametric distance value for each of the updated set of hit child nodes. Further, the apparatus may retrieve the compressed node ID and the compressed parametric distance value for each of the updated set of hit child nodes after the compressed node ID and the compressed parametric distance value for each of the updated set of hit child nodes are stored.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7A is a diagram illustrating an example bounding volume hierarchy.

FIG. 7B is a diagram illustrating an example bounding volume hierarchy.

DETAILED DESCRIPTION

Figure 1:
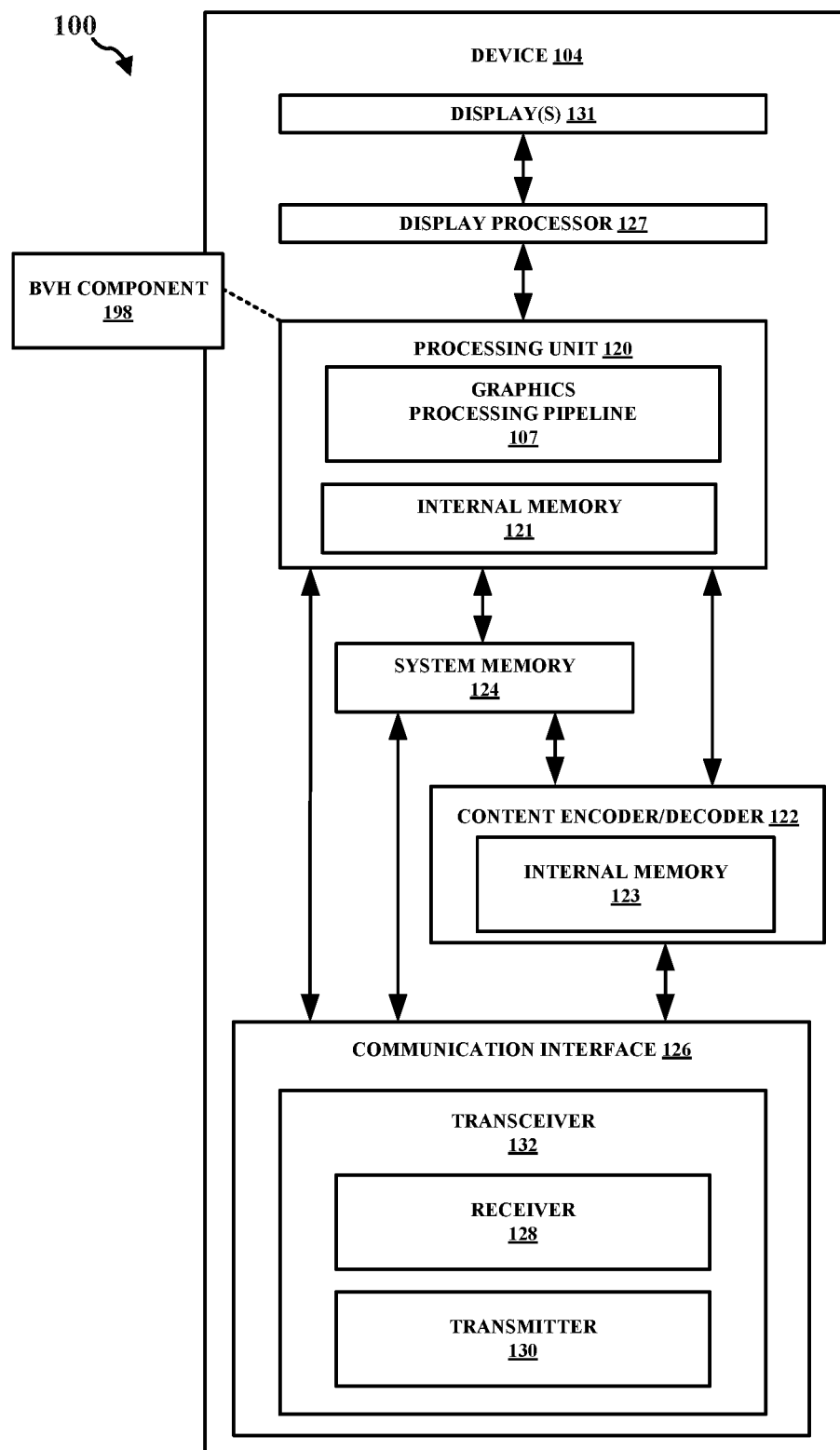
FIG. 1 is a block diagram that illustrates an example content generation system.

In some aspects of a ray tracing process, when tracing a ray, an implementation may find the closest hit child node to the ray origin, as measured by the $t_{hit}$ value (i.e., a parametric distance value between the ray origin and the hit child node, where parametric distance refers to the distance traveled in an amount of time). If a hit node's t value is closer than the current $t_{max}$ value (i.e., the maximum parametric distance value between a ray origin and a hit child node), then the new hit node may be considered the closest node from the ray origin and $t_{max}$ may be updated accordingly. A $t_{min}$ value may refer to the minimum parametric distance value between a ray origin and a hit child node. In some instances, to minimize the number of traversal steps, if the t value of the axis-aligned bounding box (AABB) of a subtree of the BVH is greater than the $t_{max}$ value, the whole subtree may be skipped since no hit node in that particular subtree can possibly be closer than $t_{max}$. Some types of ray tracing units (RTUs) may handle this when processing a node by considering which of the child node boxes (e.g., up to 8 child node boxes) in the node meet the following criteria: (a) hit the ray, and (b) hit at a t value less than $t_{max}$. Child nodes that meet both criteria may be returned by the RTU and may be placed on the stack. A further optimization may be to store the t value of each AABB hit that is placed on the stack. When retrieving entries from the stack (i.e., popping the stack) to find the next subtree to traverse, the stack entry's t value may be compared against the current $t_{max}$. If the stack entry is greater than $t_{max}$, the stack entry may be discarded. This may occur if $t_{max}$ was reduced by encountering a hit node between the time the entry was added (i.e., pushed) onto the stack and the time the entry was retrieved (i.e., popped). However, in some instances, this optimization may not be possible in ray tracing hardware because the t value per stack increases (e.g., doubles) the amount of memory (e.g., general-purpose registers (GPRs) or random-access memory (RAM)) needed for ray stacks. Accordingly, storing the t value may utilize a high amount of memory and/or power at the GPU and take a lot of time to process. Aspects of the present disclosure may improve the speed and power efficiency of tree traversal operations that are processed during ray tracing. In some instances, aspects presented herein may improve the speed and the power efficiency of the tree traversal operations at the core of a ray tracing algorithm by skipping redundant invocations of the RTU. Moreover, aspects of the present disclosure may reduce the amount of memory utilized for tree traversal operations in ray tracing. In order to do so, aspects of the present disclosure may compress certain aspects of the tree traversal operations. For instance, aspects of the present disclosure may compress the node IDs and/or $t_{hit}$ values that are utilized in tree traversal operations. For example, a stack entry for a node ID and/or $t_{hit}$ value may be compressed prior to being stored or added (i.e., pushed) onto a stack.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a BVH component 198 configured to configure a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). The BVH component 198 may also be configured to detect a set of hit child nodes for a current node of the plurality of nodes, each of the set of hit child nodes being intersected by a current ray from a ray tracing process for the current node, each of the set of hit child nodes including a node ID and a parametric distance value. The BVH component 198 may also be configured to sort the set of hit child nodes based on the parametric distance value of each of the set of hit child nodes. The BVH component 198 may also be configured to identify the hit child node with the shortest parametric distance value in the set of hit child nodes. The BVH component 198 may also be configured to exclude the hit child node with the shortest parametric distance value from the set of hit child nodes based on the identification of the hit child node with the shortest parametric distance value. The BVH component 198 may also be configured to compress the node ID and the parametric distance value for each of an updated set of hit child nodes based on the sorted set of hit child nodes, the updated set of hit child nodes excluding the hit child node with a shortest parametric distance value in the set of hit child nodes. The BVH component 198 may also be configured to store the compressed node ID and the compressed parametric distance value for each of the updated set of hit child nodes. The BVH component 198 may also be configured to retrieve the compressed node ID and the compressed parametric distance value for each of the updated set of hit child nodes after the compressed node ID and the compressed parametric distance value for each of the updated set of hit child nodes are stored. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher, a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a vertex fetcher, may use these states to determine certain functions, e.g., how a vertex is assembled. As these modes or states may change, GPUs may need to change the corresponding context. Additionally, the workload that corresponds to the mode or state may follow the changing mode or state.

Figure 2:
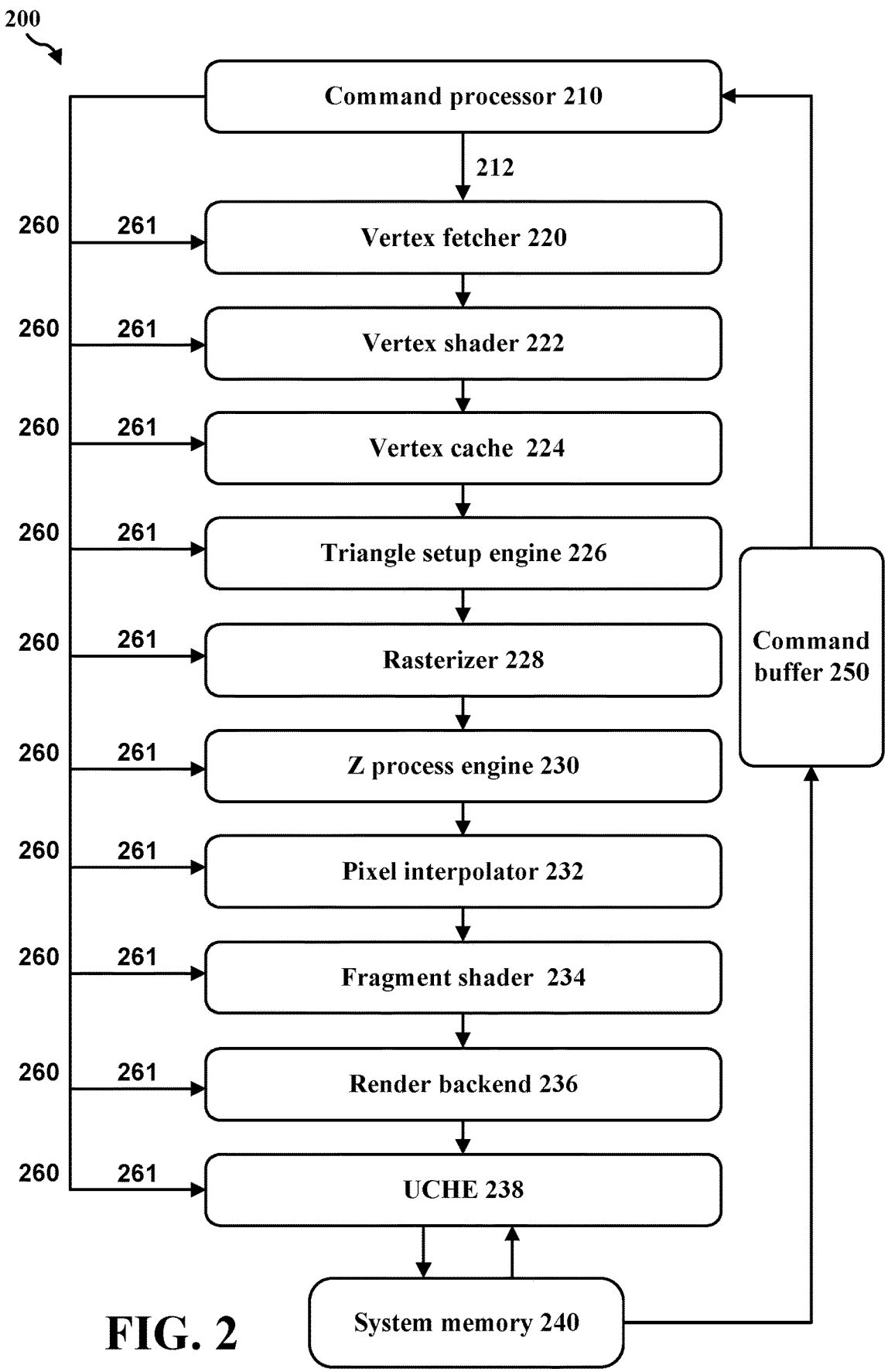
FIG. 2 is an example graphics processing unit (GPU).

FIG. 2 illustrates an example GPU 200 in accordance with one or more techniques of this disclosure. As shown in FIG. 2, GPU 200 includes command processor (CP) 210, draw call packets 212, vertex fetcher 220, VS 222, vertex cache (VPC) 224, triangle setup engine 226, rasterizer 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Some aspects of graphics processing may utilize different types of rendering techniques, such as ray tracing. Ray tracing is a rendering technique for generating an image by tracing a path of light for the pixels in an image plane and simulating the effects of its encounters with the objects in the scene. By doing so, ray tracing can produce realistic lighting effects. Ray tracing has a number of benefits including: providing more realistic effects (e.g., reflections), improved global illumination, improved glossy effects, improved depth of field, etc. Ray tracing may also help to generate different types of improved shadows, such as hard shadows and/or soft shadows. Some of the effects of ray tracing may include indirect illumination and the ability to depict caustics (i.e., the patterns of light and color that occur when light rays are reflected or refracted from a surface). As a result, ray tracing may result in the generation of photo realistic images. Ray tracing may be utilized by a number of different processors within graphics processing or data processing, such as a graphics processing unit (GPU) or a central processing unit (CPU).

Figure 3:
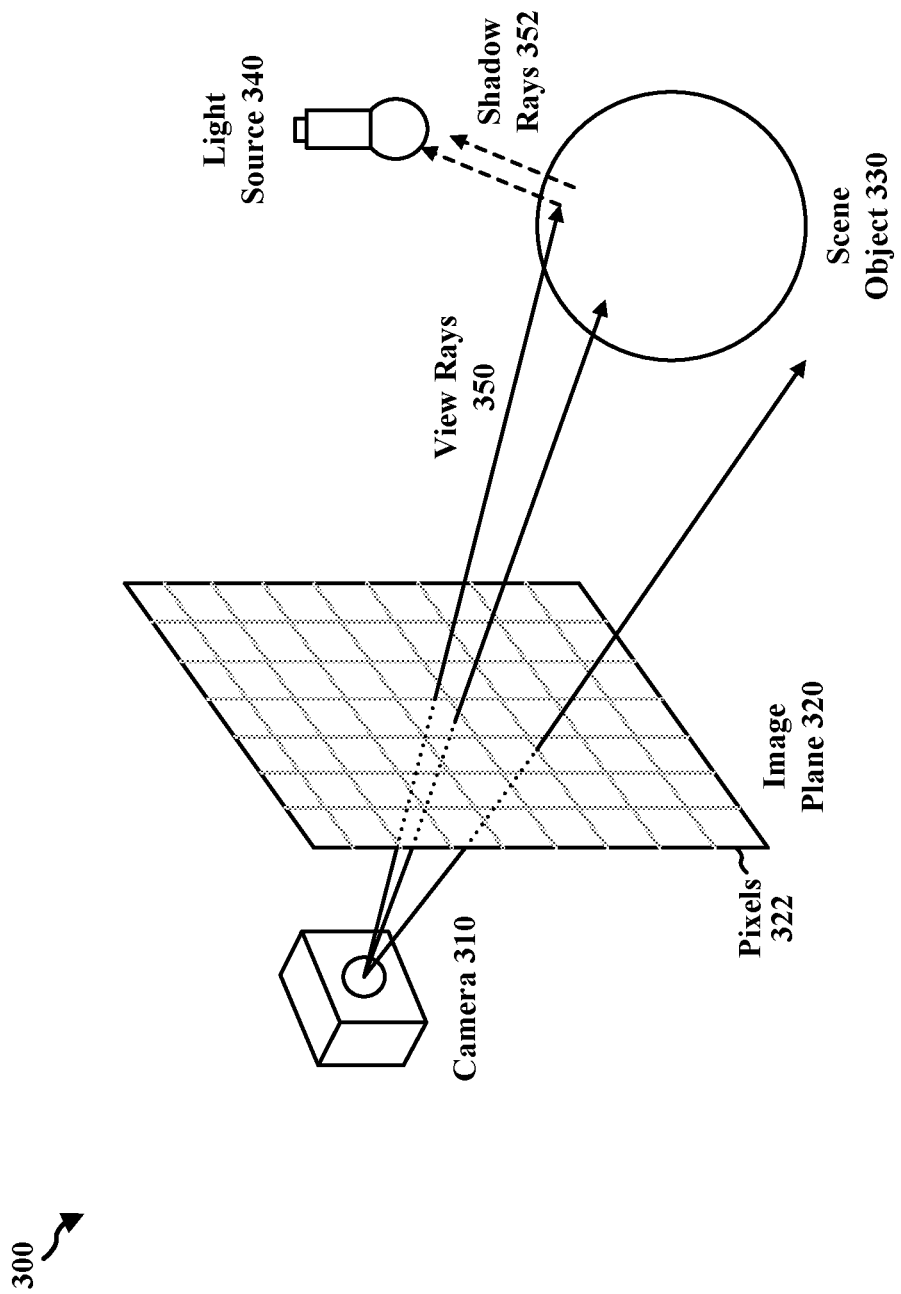
FIG. 3 is a diagram illustrating an example ray tracing process.

FIG. 3 illustrates diagram 300 including one example of a ray tracing process. As shown in FIG. 3, diagram 300 includes camera 310, image plane 320 including pixels 322, scene object 330, light source 340, view rays 350, and shadow rays 352. FIG. 3 shows that view rays 350 are traced from camera 310 and through image plane 320. After passing image plane 320, the view rays 350 are traced to scene object 330. At least some of the view rays 350 are traced off of scene object 330 and are traced towards light source 340 as shadow rays 352. Accordingly, the shadow rays 352 and view rays 350 may trace the light from light source 340 to camera 310. FIG. 3 depicts how ray tracing may generate an image by tracing the path of light (e.g., from light source 340) for the pixels in an image plane (e.g., pixels 322 in image plane 320).

Ray tracing is distinguishable from a number of other rendering techniques utilized in graphics processing, such as rasterization. In the process of rasterization, for each pixel in each primitive in a scene, the pixel may be shaded if a portion of the pixel is covered by the primitive. In contrast, in the process of ray tracing, for each pixel corresponding to a primitive in a scene, a ray is generated. If the generated ray is determined to hit or intersect a certain primitive, then the pixel is shaded. In some instances of graphics processing, ray tracing algorithms may be performed alongside rasterization, such as via a hybrid ray tracing/rasterization model.

Figures 4A, 4B:
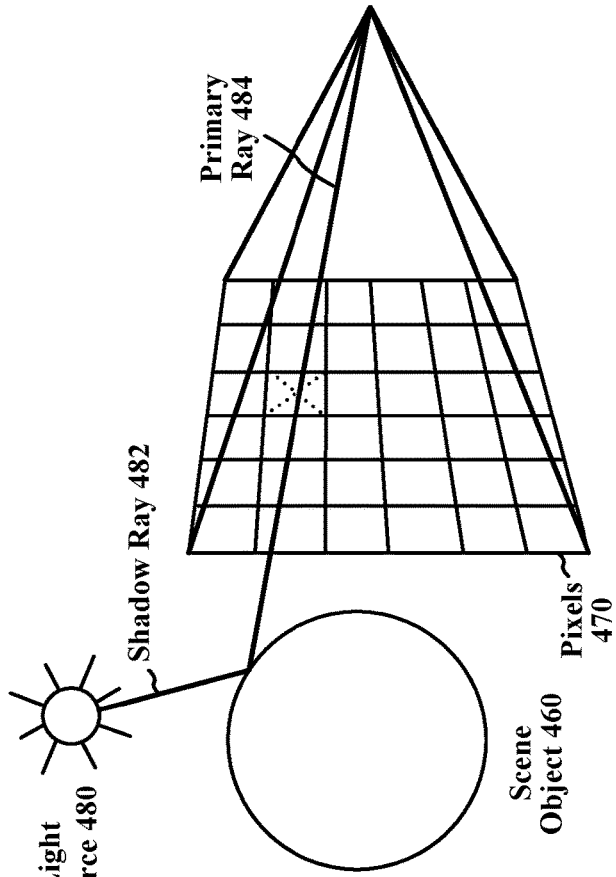
FIG. 4A is a diagram illustrating an example rasterization process.
FIG. 4B is a diagram illustrating an example ray tracing process.

FIGS. 4A and 4B illustrate diagram 400 and diagram 450 including an example process of rasterization and an example process of ray tracing, respectively. As shown in FIG. 4A, diagram 400 includes scene object 410 and pixels 420. FIG. 4A depicts that the process of rasterization determines, for each of pixels 420 in a scene including scene object 410, a pixel is shaded if at least a portion of the pixel is covered by a primitive. As shown in FIG. 4B, diagram 450 includes scene object 460, pixels 470, light source 480, shadow ray 482, and primary ray 484. FIG. 4B depicts that the process of ray tracing determines if a generated ray (e.g., shadow ray 482) will hit or intersect a certain primitive in scene object 460 corresponding to one of the pixels 470 via primary ray 484, then the pixel is shaded.

As indicated herein, the process of ray tracing may be performed by determining whether a ray will hit/intersect any primitive(s) in a scene. For example, ray tracing algorithms may perform a simple query operation: Is a given ray going to hit/intersect any primitive(s) in a scene? The process of ray tracing is computationally intensive, as a large amount of rays may be traced against a large number of primitives/triangles, which may utilize a large number of ray-triangle intersection tests. For example, in one ray tracing procedure, approximately 1 million rays may be traced against approximately 1 million primitives/triangles, which may utilize approximately 1 trillion ray-triangle intersection tests. In some aspects of ray tracing procedures, an origin point for a given ray may be represented by O(N). Further, there may be a number of values calculated for the ray, such as a minimum time to intersect primitives in a scene ($t_{min}$), a maximum time to intersect primitives in a scene ($t_{max}$), and a calculated distance to intersect primitives in the scene.

Figure 5:
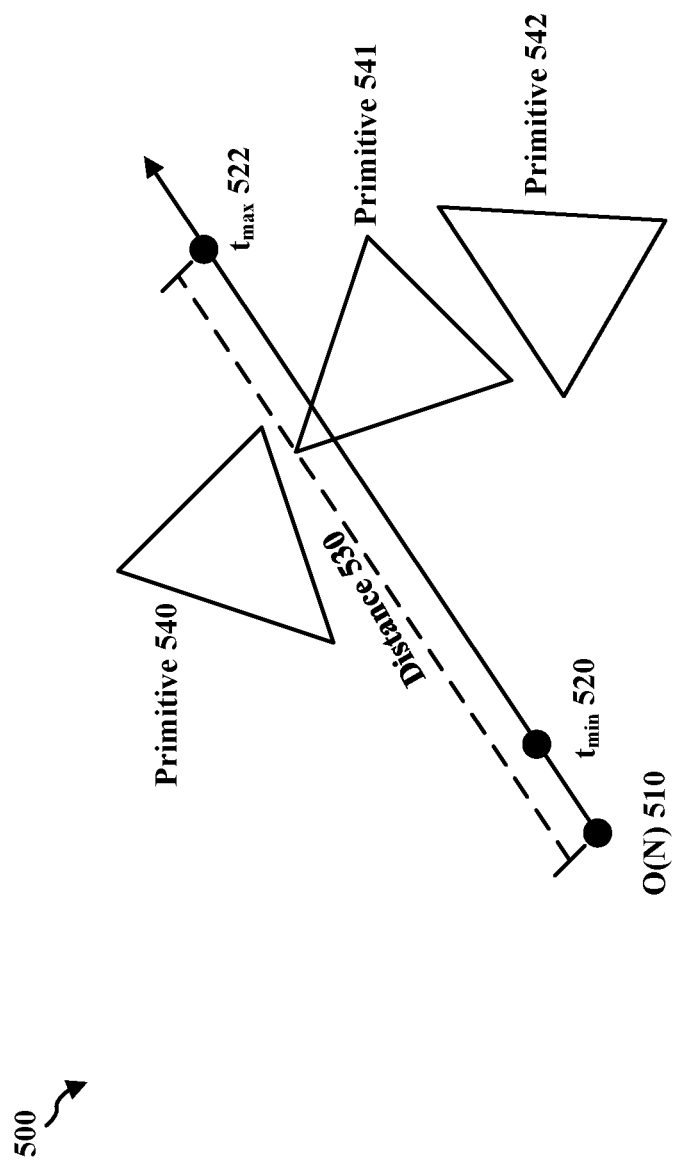
FIG. 5 is a diagram illustrating an example ray tracing process.

FIG. 5 illustrates diagram 500 including one example of a ray tracing process involving triangles as primitives. As shown in FIG. 5, diagram 500 includes origin point for a ray (O(N) 510), a minimum time to intersect primitives in a scene ($t_{min}$ 520), a maximum time to intersect primitives in a scene ($t_{max}$ 522), a calculated distance to intersect primitives in the scene (distance 530), and a number of primitives (primitive 540, primitive 541, and primitive 542) in the scene. FIG. 5 shows that ray tracing techniques may utilize a number of values to determine if a ray is going to hit a primitive. For instance, to determine if a ray will intersect a primitive, ray tracing techniques may utilize an origin point for a ray (O(N) 510), a minimum time to intersect primitives ($t_{min}$ 520), a maximum time to intersect primitives ($t_{max}$ 522), a calculated distance to intersect primitives (distance 530), and a number of primitives (primitive 540, primitive 541, and primitive 542).

Ray tracing may utilize various data structures for accelerating a computational process, such as a bounding volume hierarchy (BVH). In a bounding volume hierarchy, primitives are held in leaf nodes. Further, internal or inner nodes may hold bounding boxes/volumes, such as axis-aligned bounding boxes (AABBs), defined by a pair of bounding planes in each of three dimensions, that enclose certain leaf node geometry. Each of the AABBs may include one or more (geometric) primitives, where the number of primitives within each AABB may vary. Data structures for ray tracing may also utilize a ray-box intersection for internal nodes and/or a ray-triangle test for leaf nodes. These types of data structures may reduce the computational complexity (N) of the ray tracing process, e.g., reduce the computational complexity (N) by log(N).

Figure 6B:
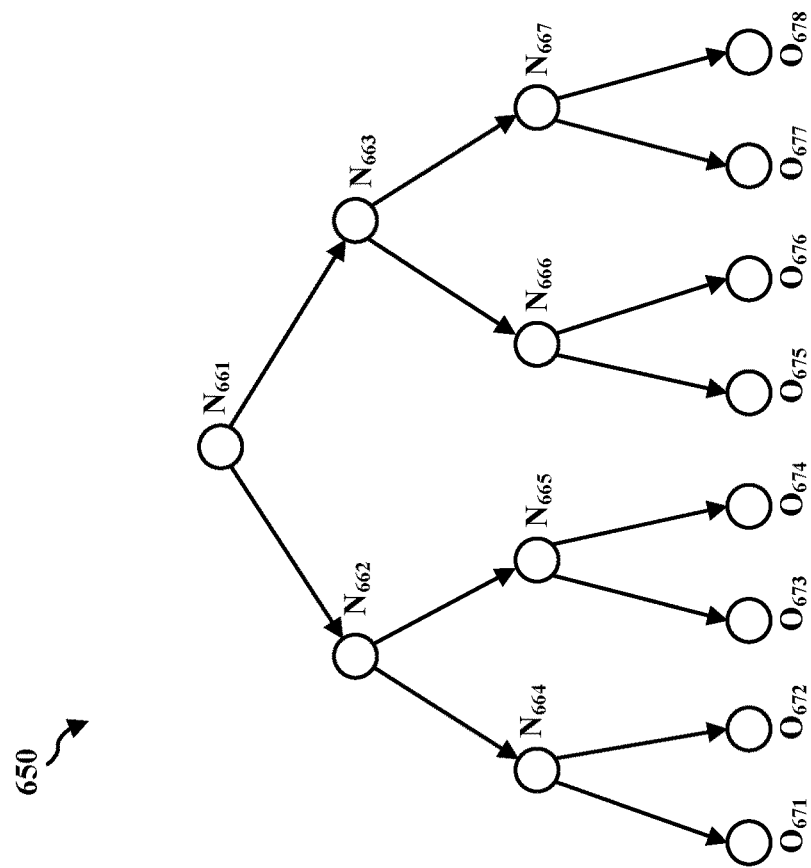
FIG. 6B is a diagram illustrating an example data structure.
Figure 6A:
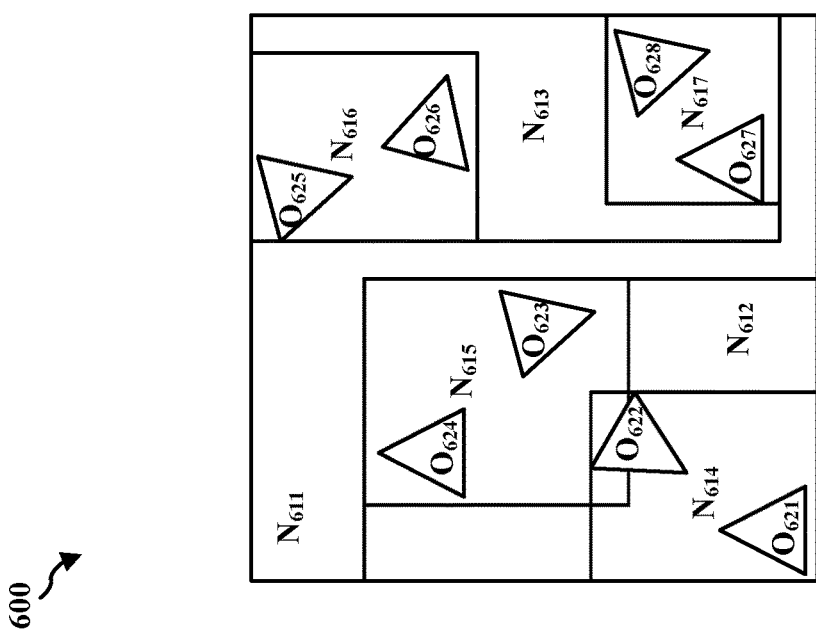
FIG. 6A is a diagram illustrating an example data structure.

FIGS. 6A and 6B illustrate diagram 600 and diagram 650, respectively, including example data structure techniques utilized in ray tracing. As shown in FIG. 6A, diagram 600 includes a number of nodes (nodes $N_{611}$-$N_{617}$) and a number of primitives (primitives $O_{621}$-$O_{628}$). FIG. 6A depicts a ray-box intersection for nodes $N_{611}$-$N_{617}$ and primitives $O_{621}$-$O_{628}$. As shown in FIG. 6B, diagram 650 includes a number of nodes (nodes $N_{661}$-$N_{667}$) and a number of primitives (primitives $O_{671}$-$O_{678}$). FIG. 6B depicts a ray-triangle test for nodes $N_{661}$-$N_{667}$ and primitives $O_{671}$-$O_{678}$. Both of the data structure techniques in FIGS. 6A and 6B, e.g., the ray-box intersection and the ray-triangle test, aim to reduce the computational complexity in ray tracing.

As indicated herein, there are a number of different stages during a ray tracing process. For example, the stages of ray tracing may include: bounding volume hierarchy construction and refinement, ray generation, bounding volume hierarchy traversal, ray-triangle intersection, and ray-box intersection. There may also be different steps during bounding volume hierarchy construction, including partitioning triangles into multiple groups, forming a bounding box around each group, and recursively partitioning each group. Additionally, there may be several ways to partition during bounding volume hierarchy construction, which may result in a certain number of possible solutions, e.g., $2^{n \log n}$ solutions. As a result, these improved solutions may yield improved ray tracing performance.

Aspects of ray tracing may also utilize a number of bounding volume hierarchy algorithms, such as split bounding volume hierarchy (SBVH) and linear bounding volume hierarchy (LBVH). In some instances, SBVH may result in slower build times and better quality compared to LBVH. Likewise, LBVH may result in faster build times and poorer quality compared to SBVH. Additionally, some aspects of ray tracing may utilize bounding volume hierarchy refinement. In bounding volume hierarchy refinement, given a binary BVH with one triangle per leaf, ray tracing techniques may permute the tree topology. Bounding volume hierarchy refinement may utilize different algorithms, e.g., a treelet restructuring BVH (TRBVH) and a parallel reinsertion BVH (PRBVH). Some aspects of ray tracing may also utilize BVH widening, which may convert a binary tree (e.g., a BVH) to a wide BVH (e.g., an 8-branch wide BVH). In some instances of BVH widening, an internal node may include up to eight AABBs and a leaf node may include up to four primitives or triangles.

FIGS. 7A and 7B illustrate diagram 700 and diagram 750 including a binary bounding volume hierarchy and a wide bounding volume hierarchy, respectively. As shown in FIG. 7A, diagram 700 includes a binary bounding volume hierarchy 710 including primitive 711, primitive 712, primitive 713, and primitive 714. FIG. 7A depicts that binary bounding volume hierarchy 710 includes three levels, where primitives 711-714 are in the third level of the hierarchy. As shown in FIG. 7B, diagram 750 includes a wide bounding volume hierarchy 760 including primitive 761, primitive 762, primitive 763, and primitive 764. FIG. 7B depicts that wide bounding volume hierarchy 760 includes two levels, where primitives 761-764 are in the second level of the hierarchy. As shown in FIGS. 7A and 7B, binary bounding volume hierarchy 710 may undergo a process of bounding volume hierarchy widening that results in wide bounding volume hierarchy 760.

Some aspects of ray tracing may utilize bounding volume hierarchy compression. For instance, ray tracing techniques may compress wide nodes to fit a fixed size (e.g., 64 bytes). The BVH compression may include an internal node compression that compresses an amount of AABBs (e.g., eight AABBs) and/or a first child index. The BVH compression may also include a leaf node compression that compresses a certain amount of primitives/triangles (e.g., up to four primitives/triangles) and the corresponding indices. Also, ray tracing techniques may utilize bounding volume hierarchy traversal, such as breadth first search traversal and/or depth first search traversal of a wide BVH. Some aspects of ray tracing generation may utilize an operation where rays are generated on-the-fly. For instance, a number a different types of rays may be generated such as primary rays, shadow rays, and/or secondary rays.

Additionally, there may be a number of different ray tracing stages utilized in hardware or software, e.g., GPU/CPU hardware or software. For instance, in certain stages (e.g., a BVH construction stage and a BVH node compression stage), a driver may construct the BVH on a CPU or GPU. In a BVH traversal stage, the BVH traversal may occur in the shader at the GPU. Also, certain stages (e.g., a BVH node decompression stage, a ray-bounding box intersection stage, and a ray-triangle intersection stage) may be implemented within GPU hardware.

As indicated previously, ray tracing procedures may include computer graphics algorithms that produce photorealistic renderings with a higher degree of photorealism compared to other types of algorithms (e.g., rasterization algorithms). Modern GPUs may run ray tracing applications through certain units (e.g., a compute shader) but may often fail to perform these applications in an efficient manner, such as via GPU ray tracing software. Some types of ray tracing algorithms may utilize certain types of hardware accelerators, such as a ray tracing unit (RTU). The RTU may enable hardware-accelerated ray tracing on the GPU to accelerate the ray tracing operation and allow the GPU to consume less power compared to running the ray tracing operation on compute shaders.

Some types of ray tracing algorithms may include tree traversal operations, where the core of the algorithm is the tree traversal operation. In some aspects, scenes may be converted into a bounding volume hierarchy (BVH), which is a hierarchical tree structure composed of ever-tighter bounding volumes. For example, this may conceptually be a binary tree, but in practice some implementations may have four or eight children per node. Some types of RTUs may utilize a compressed short stack approach during traversal. For instance, the RTU may traverse a given BVH node and return the result of a tree traversal hop to a GPU component, e.g., a compute shader. Additionally, the compute shader may maintain a traversal stack of finite size to keep track of which nodes may need to be traversed next.

In some aspects of ray tracing, a BVH traversal algorithm may rely on a stack (i.e., a type of memory or cache), such as a traversal stack. The traversal stack may contain the unique identifiers of the nodes that may still need to be traversed. One implementation of a traversal stack may utilize a BVH with a certain branching factor (e.g., a branching factor of 8). A ray intersection of one interior node or inner node may lead to a number of intersections corresponding to the number of child nodes (i.e., children) that a ray may need to traverse. For example, the intersection of one interior node that results in 8 intersections may mean a certain ray may need to traverse 8 child nodes. When traversing 8 child nodes, the closest child node may be traversed immediately while the remaining 7 child nodes may need to be added to (i.e., pushed onto) the traversal stack for a later traversal. Additionally, some ray tracing units (RTUs) may use a compressed short stack approach that stores the amount of child nodes (e.g., 7 child nodes) in one stack entry. In some aspects of ray tracing, each node in a BVH structure may be tagged with a unique identification or identifier (ID), which may be referred to as a node ID (e.g., a 32-bit node ID). In the example of traversing 8 child nodes, one approach may be to add (i.e., push) all 7 child nodes onto a stack by adding (i.e., pushing) the 7 individual node IDs (e.g., 32-bit node IDs).

In some aspects, when tracing a ray in a ray tracing process, an implementation may find the closest hit child node to the ray origin, as measured by the $t_{hit}$ value (i.e., a parametric distance value between the ray origin and the hit child node, where parametric distance refers to the distance traveled in an amount of time). In general, the $t_{hit}$ value represents the distance between the origin of a ray and the intersection of that ray with the scene's geometry. The $t_{hit}$ value may also refer to the time that a ray will take to travel from a ray origin to a given hit child node. As a given ray may include a direction and a magnitude, the $t_{hit}$ value may correspond to a certain magnitude in terms of the ray direction. If a hit node's t value is closer than the current $t_{max}$ value (i.e., the maximum parametric distance value between a ray origin and a hit child node), then the new hit node may be considered the closest node from the ray origin and $t_{max}$ may be updated accordingly. The $t_{max}$ value may also refer to the maximum time that a ray will take to travel from a ray origin to a hit child node. A $t_{min}$ value may refer to the minimum parametric distance value between a ray origin and a hit child node, or the minimum time that a ray will take to travel from a ray origin to a hit child node. In some instances, to minimize the number of traversal steps, if the t value of the AABB of a subtree of the BVH is greater than the $t_{max}$ value, the whole subtree may be skipped since no hit node in that particular subtree can possibly be closer than $t_{max}$. Some types of RTUs may handle this when processing a node by considering which of the child node boxes (e.g., up to 8 child node boxes) in the node meet the following criteria: (a) hit the ray, and (b) hit at a t value less than $t_{max}$. Child nodes that meet both criteria may be returned by the RTU and may be placed on the stack.

A further optimization may be to store the t value of each AABB hit that is placed on the stack. When retrieving entries from the stack (i.e., popping the stack) to find the next subtree to traverse, the stack entry's t value may be compared against the current $t_{max}$. If the stack entry is greater than $t_{max}$, the stack entry may be discarded. This may occur if $t_{max}$ was reduced by encountering a hit node between the time the entry was added (i.e., pushed) onto the stack and the time the entry was retrieved (i.e., popped). However, in some instances, this optimization may not be possible in ray tracing hardware because the t value per stack increases (e.g., doubles) the amount of memory (e.g., general-purpose registers (GPRs) or random-access memory (RAM)) needed for ray stacks. Accordingly, storing the t value may utilize a high amount of memory and/or power at the GPU and take a lot of time to process.

Based on the above, it may be beneficial to improve the speed and power efficiency of tree traversal operations that are processed during ray tracing. Also, it may be beneficial to reduce the amount of memory utilized for tree traversal operations in ray tracing. In order to do so, it may be beneficial to compress certain aspects of the tree traversal operations. For instance, it may be beneficial to compress the node IDs and/or $t_{hit}$ values utilized in tree traversal operations in ray tracing.

Aspects of the present disclosure may improve the speed and power efficiency of tree traversal operations that are processed during ray tracing. In some instances, aspects presented herein may improve the speed and the power efficiency of the tree traversal operations at the core of a ray tracing algorithm by skipping redundant invocations of the RTU. Moreover, aspects of the present disclosure may reduce the amount of memory utilized for tree traversal operations in ray tracing. In order to do so, aspects of the present disclosure may compress certain aspects of the tree traversal operations. For instance, aspects of the present disclosure may compress the node IDs and/or $t_{hit}$ values that are utilized in tree traversal operations. For example, a stack entry for a node ID and/or $t_{hit}$ value may be compressed prior to being stored or added (i.e., pushed) onto a stack.

As indicated herein, a traversal stack may hold one entry for each BVH level, where each entry may contain the unique identifiers of the nodes that may still need to be traversed. A unique node identifier (ID) along with a base pointer to the acceleration structure may be utilized so the RTU can perform a single tree traversal operation. Aspects presented herein may extend the current stack to include the $t_{hit}$ value of the level. Additionally, aspects presented herein may store the $t_{hit}$ value on the stack, where the $t_{hit}$ value may represent the minimal distance of any future intersection at a given level of the BVH hierarchy. The extended stack may provide an additional advantage of being able to skip redundant RTU invocations.

In some aspects, when retrieving (i.e., popping) a stack entry for a certain node from the stack, a ray's current $t_{max}$ value may be compared to the $t_{hit}$ value of the stack entry. As indicated herein, a $t_{max}$ value for a certain ray may represent an upper bound on the final $t_{hit}$ value. Further, the ray's $t_{max}$ value may be updated during the ray's traversal through the tree. In some instances, if the current $t_{max}$ value is smaller than a particular stored $t_{hit}$ value for a node, the intersection of the ray with the popped stack entry for the node may not yield a closer hit node. Therefore, this particular stored $t_{hit}$ value for the node may be skipped or ignored, as it may be greater than the correct result for the $t_{hit}$ value of any closest-hit node for the ray.

Aspects presented herein may store the $t_{hit}$ value of the closest intersected node or the second closest intersected node to the ray origin point onto the stack (e.g., $t_{hit}$ stack). As such, when the stack (e.g., $t_{hit}$ stack) is queried, it may return the $t_{hit}$ value of the closest intersected node or the second closest intersected node to the ray origin point. Based on this, the $t_{hit}$ stack may correspond to a particular design choice of the RTU. In some instances, the short stack traversal algorithm may query the RTU for the next node that should be traversed (i.e., traversed into), as well as all nodes that may need to be placed on the stack. Also, the $t_{hit}$ value of the closest hit node that is not traversed (i.e., traversed into) after querying the RTU may be utilized to enable this particular optimization. Aspects presented herein may allow an RTU to return this value that will enable the $t_{hit}$ stack optimization.

Figure 8:
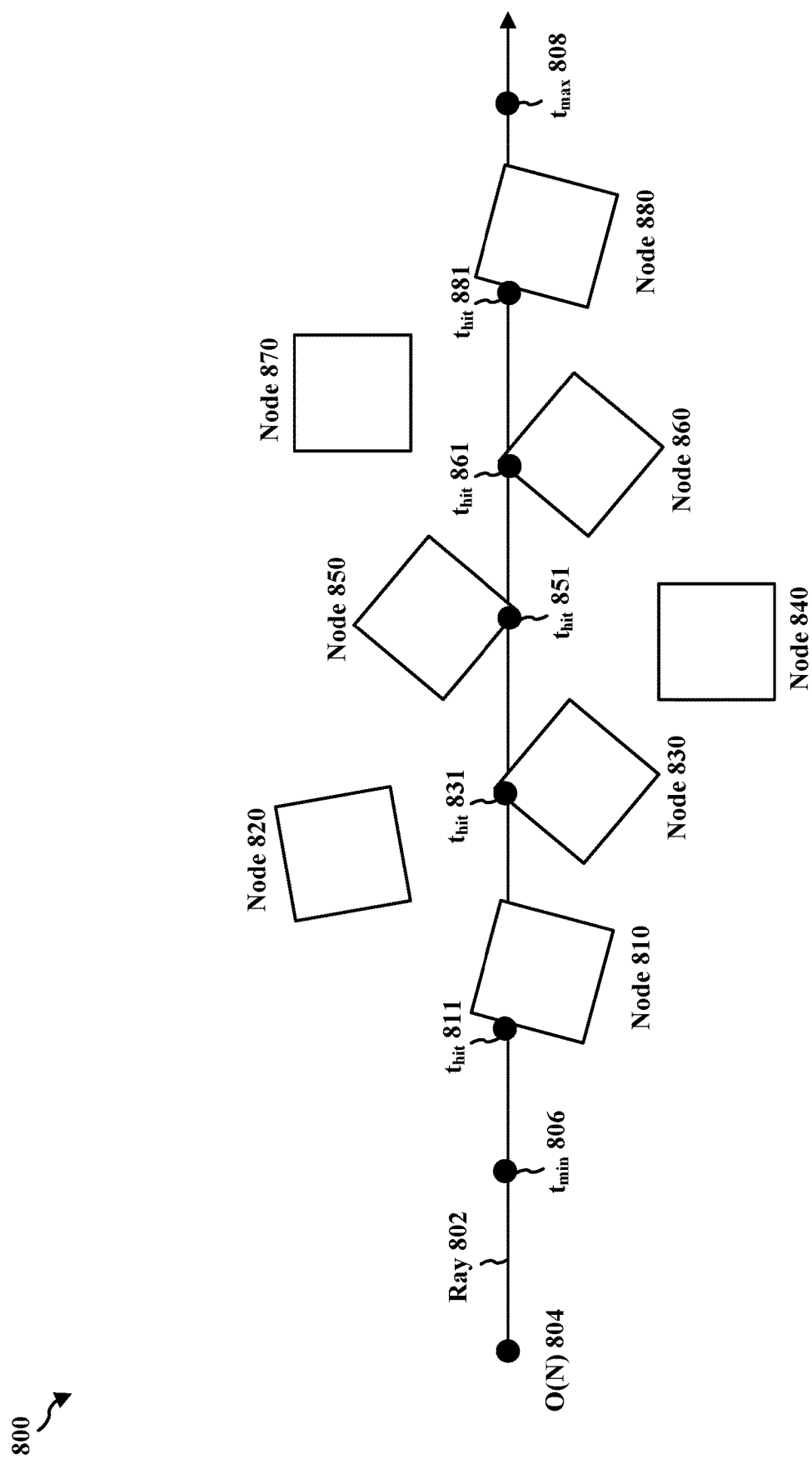
FIG. 8 is a diagram illustrating an example node intersection for a ray tracing procedure.

FIG. 8 illustrates diagram 800 including one example of a node intersection for a certain ray of a ray tracing procedure. More specifically, diagram 800 in FIG. 8 shows a ray 802 intersecting a number of nodes associated with geometry data for a plurality of primitives in a scene. As shown in FIG. 8, diagram 800 includes ray 802, node 810, node 820, node 830, node 840, node 850, node 860, node 870, and node 880. FIG. 8 also depicts a ray origin point 804 (O(N)) for ray 802, $t_{min}$ 806, and $t_{max}$ 808. As indicated above, $t_{max}$ 808 may refer to the maximum parametric distance value between a ray origin point 804 and a hit child node. Also, $t_{min}$ 806 may refer to the minimum parametric distance value between ray origin point 804 and a hit child node. As illustrated in FIG. 8, ray 802 intersects nodes 810, 830, 850, 860, and 880 at corresponding $t_{hit}$ values: $t_{hit}$ 811, $t_{hit}$ 831, $t_{hit}$ 851, $t_{hit}$ 861, and $t_{hit}$ 881. The $t_{hit}$ values refer to the parametric distance between the ray origin point 804 and the corresponding hit child node. For example, $t_{hit}$ 811 is the parametric distance between the ray origin point 804 and node 810. As further shown in FIG. 8, ray 802 does not intersect nodes 820, 840, and 870.

Aspects presented herein may store the $t_{hit}$ values shown in FIG. 8 onto a stack. For instance, $t_{hit}$ 811, $t_{hit}$ 831, $t_{hit}$ 851, $t_{hit}$ 861, and $t_{hit}$ 881 in FIG. 8 may be stored onto a stack (e.g., stack 910 in FIG. 9). The values of $t_{hit}$ 811, $t_{hit}$ 831, $t_{hit}$ 851, $t_{hit}$ 861, and $t_{hit}$ 881 may represent the minimal distance of any future intersection at a given level of the BVH hierarchy. Additionally, a current stack may be extended to include the values of $t_{hit}$ 811, $t_{hit}$ 831, $t_{hit}$ 851, $t_{hit}$ 861, and $t_{hit}$ 881 shown in FIG. 8. The extended stack may provide an additional advantage of being able to skip redundant RTU invocations.

Figure 9:
FIG. 9 is a diagram illustrating an example stack for a ray tracing procedure.

FIG. 9 illustrates diagram 900 including one example of a stack utilized in a ray tracing procedure. More specifically, diagram 900 in FIG. 9 shows stack 910 that is utilized to store different node IDs and $t_{hit}$ values. As shown in FIG. 9, the $t_{hit}$ values and corresponding node IDs in FIG. 8 may be stored in the stack 910. For example, the following $t_{hit}$ values and node IDs may be stored in the stack 910: $t_{hit}$ 831 and node ID for node 830, $t_{hit}$ 851 and node ID for node 850, $t_{hit}$ 861 and node ID for node 860, and $t_{hit}$ 881 and node ID for node 880. In some instances, as shown in FIG. 9, the $t_{hit}$ value and/or the node ID of the closest intersected node (e.g., $t_{hit}$ 811 and node ID for node 810) may not be stored in the stack 910. In other instances, the $t_{hit}$ value and/or the node ID of the closest intersected node (e.g., $t_{hit}$ 811 and node ID for node 810) may be stored in the stack 910.

In some aspects, as shown in FIGS. 8 and 9, aspects presented herein may store the $t_{hit}$ value and/or the node ID of the closest intersected node or the second closest intersected node to a ray origin point in the stack 910. For instance, $t_{hit}$ 811 and node ID for node 810 may be stored in the stack 910 and/or $t_{hit}$ 831 and node ID for node 830 may be stored in the stack 910. As such, when the stack 910 is queried, it may return the $t_{hit}$ value and/or the node ID of the closest intersected node to the ray origin point (e.g., node 810) or the second closest intersected node to the ray origin point (e.g., node 830). In instances of storing the $t_{hit}$ value and/or the node ID of the second closest intersected node (e.g., node 830), the $t_{hit}$ value and/or the node ID of the closest intersected node (e.g., node 810) may be utilized to enable this particular implementation. Accordingly, aspects presented herein may store the $t_{hit}$ value and/or the node ID of the closest intersected node (e.g., node 810) to the ray origin point (e.g., ray origin point 804), the second closest intersected node (e.g., node 830) to the ray origin point, the hit child nodes except the closest intersected node (e.g., node 830, node 850, node 860, and node 880), and/or all of the hit child nodes (e.g., node 810, node 830, node 850, node 860, and node 880) intersected by a certain ray (e.g., ray 802). FIG. 9 shows the example of storing the $t_{hit}$ value and/or the node ID of the hit child nodes except the closest intersected node (e.g., node 830, node 850, node 860, and node 880). As further shown in FIG. 9, when storing node IDs and $t_{hit}$ values for hit child nodes onto the stack 910, the hit child nodes may be sorted in a certain order (e.g., an ascending or descending order of the $t_{hit}$ values for the nodes) prior to storage on the stack 910.

In some aspects, stack entries for the stack (e.g., $t_{hit}$ stack) may need to be stored on a per-ray basis. On the GPU, this may correspond to the stack per-fiber being stored in general-purpose registers (GPRs). This may result in additional memory overhead, which may cause the number of waves to drop because each wave may utilize a larger percentage of the register file. In order to minimize the amount of memory overhead, aspects presented herein may utilize a compression scheme for the floating point $t_{hit}$ values. For instance, aspects presented herein may compress the $t_{hit}$ values for a set of hit child nodes, such that the compression of the $t_{hit}$ values for the hit child nodes may reduce an amount of floating point bits that represent the $t_{hit}$ values. This compression may achieve a certain reduction in memory overhead (e.g., a 50% reduction in memory overhead) at a minimum performance penalty cost (e.g., a 2% performance penalty cost). Indeed, this compression scheme may provide a reduction in memory overhead compared to a baseline $t_{hit}$ stack implementation. This reduction in memory overhead based on the compression scheme may also be utilized for ray tracing implementations that store traversal stacks in dedicated on-GPU RAM, general on-GPU RAM, or system memory.

As indicated above, in some instances, prior to storage onto the stack 910, the $t_{hit}$ value and/or the node ID of the hit child nodes may be compressed. For example, $t_{hit}$ 831, $t_{hit}$ 851, $t_{hit}$ 861, $t_{hit}$ 881 and node IDs for node 830, node 850, node 860, and node 880 may be compressed prior to storage onto the stack 910. In some aspects, the node ID and the $t_{hit}$ value for each of the set of hit child nodes may be compressed to a size that is a non-integer number of bytes. Accordingly, the compressed $t_{hit}$ values may be stored as a number of bytes that is not an integer multiple (e.g., not a multiple of 8). Further, the compression of the $t_{hit}$ values for the set of hit child nodes may reduce an amount of floating point bits that represent the $t_{hit}$ values for the set of hit child nodes. Moreover, the compression of the $t_{hit}$ value for the set of hit child nodes may discard a sign bit of the $t_{hit}$ value for each of the hit child nodes. For instance, the sign bit of a floating point number may not be needed since t values in ray tracing are non-negative. For example, storing 16 bits corresponds to 8 exponent bits and 8 mantissa bits. Further, the use of a compressed traversal stack may be synergistic because a single $t_{hit}$ value may pertain to multiple nodes for traversal that are at the same level of the BVH structure. This may allow a reduction in storage space (e.g., an 8× reduction) for $t_{hit}$ values stored on the stack, as well as allow for an increase (e.g., an 8× increase) in the rate of discarding nodes on the stack, as a single discard may apply to a stack entry for an entire level.

Figure 10:
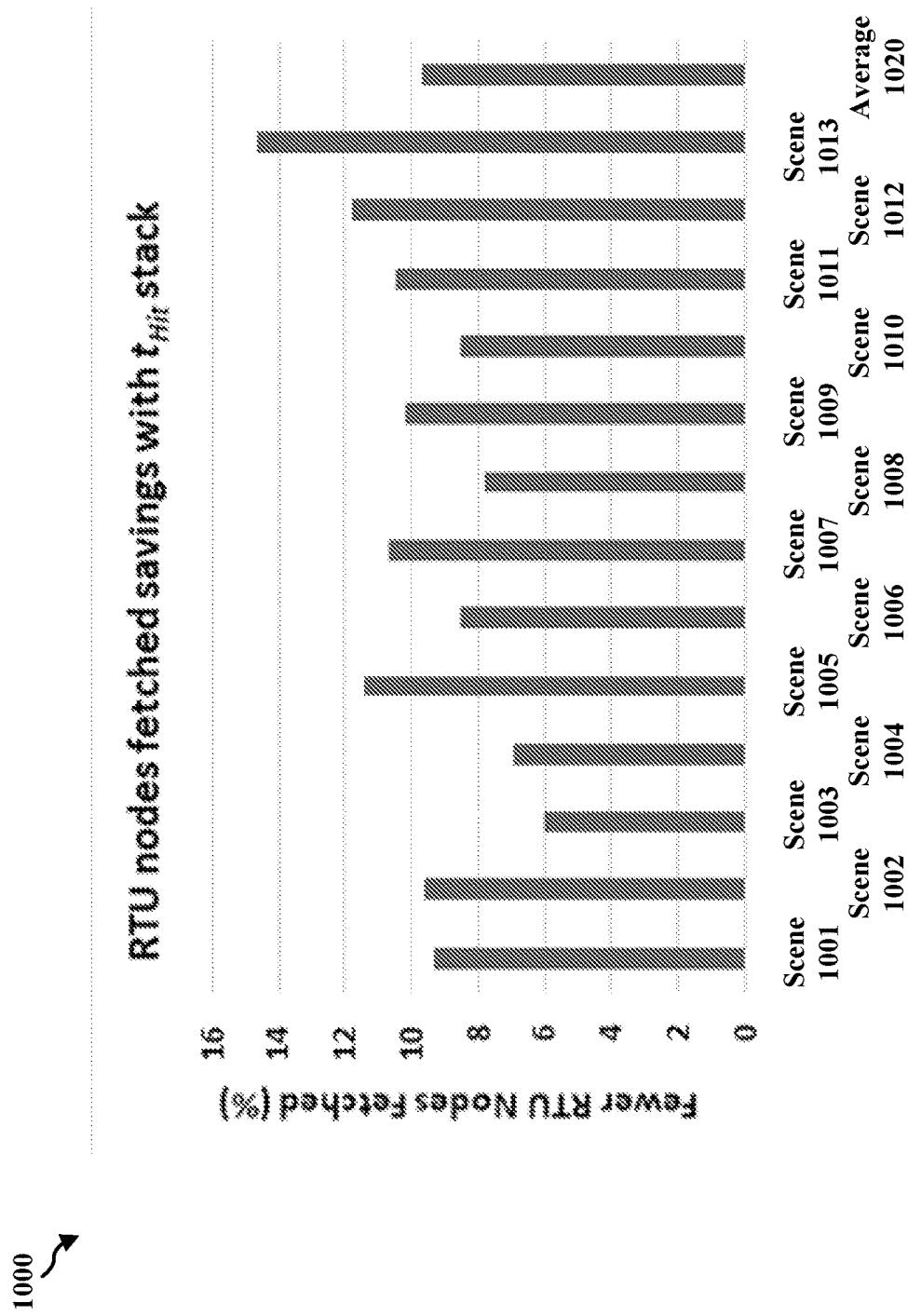
FIG. 10 is a diagram illustrating an example graph charting a reduction in nodes fetched for a number of scenes in a ray tracing procedure.

FIG. 10 illustrates graph 1000 that charts a reduction in RTU nodes fetched for a number of scenes. More specifically, graph 1000 in FIG. 10 shows the percentage reduction in RTU nodes fetched for a number of scenes, e.g., scene 1001, scene 1002, scene 1003, scene 1004, scene 1005, scene 1006, scene 1007, scene 1008, scene 1009, scene 1010, scene 1011, scene 1012, and scene 1013. FIG. 10 also shows the average percentage reduction in RTU nodes fetched for all of the scenes 1001-1013 (e.g., average 1020). FIG. 10 depicts a maximal reduction in RTU invocations according to aspects of the present disclosure. For example, as shown in FIG. 10, storing the $t_{hit}$ value in a stack (e.g., stack 910) saves about 10% of all RTU invocations on average (e.g., average 1020). The RTU nodes fetched for graph 1000 in FIG. 10 were gathered across a variety of scenes using a primary benchmark (i.e., representing rays from a camera) and a diffuse benchmark (i.e., representing the diffuse lighting in a scene). For instance, for each of these benchmarks, the scene was rendered from three camera angles and the results were averaged.

Figure 11:
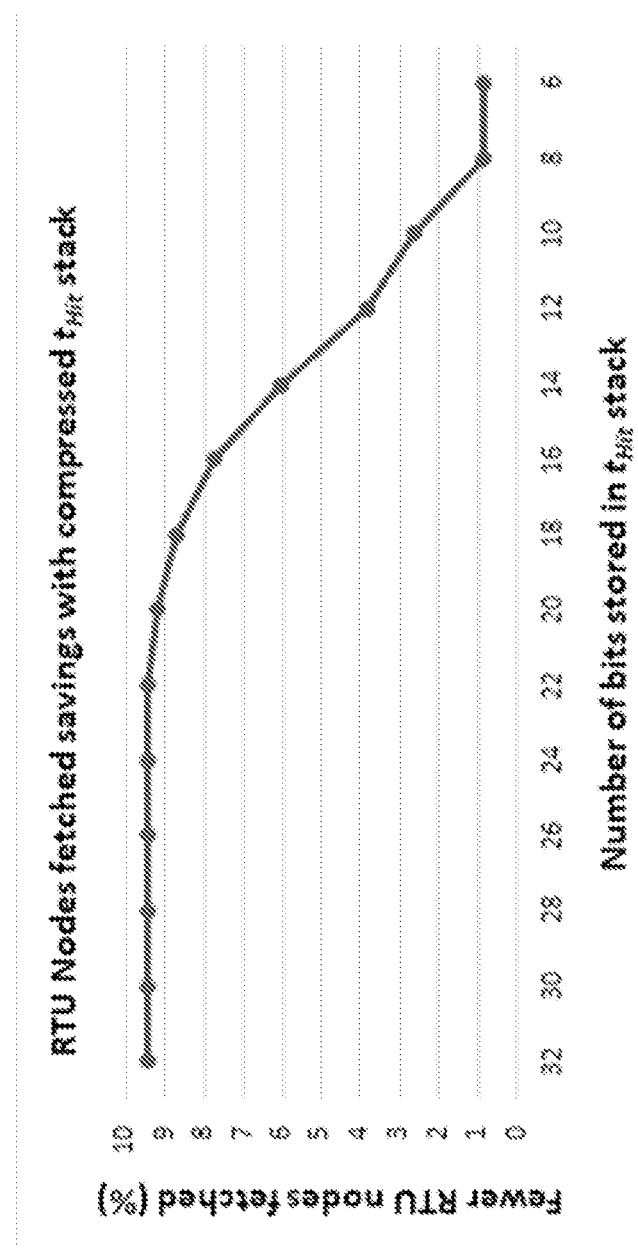
FIG. 11 is a diagram illustrating an example graph charting a reduction in nodes fetched for a number of bits in a ray tracing procedure.

FIG. 11 illustrates graph 1100 that charts a reduction in nodes fetched for a number of bits. More specifically, graph 1100 in FIG. 11 shows a reduction in RTU nodes fetched for a corresponding number of bits stored in a $t_{hit}$ stack. FIG. 11 depicts the compression effectiveness when storing a reduced precision $t_{hit}$. That is, FIG. 11 displays the effectiveness of the $t_{hit}$ stack at variable levels of compression on the stored $t_{hit}$ value. This compression of $t_{hit}$ values addresses the memory overhead issue of the $t_{hit}$ stack. FIG. 11 shows that at a 50% compression rate (e.g., 16 bits per floating point t value compared to 32 bits per floating point t value), the $t_{hit}$ stack does not experience much of a performance drop-off. For example, the effectiveness of the stack drops by about 2% from its uncompressed peak when compressing the $t_{hit}$ value by 50%. FIG. 11 illustrates that the tradeoff between the effectiveness of the stack and the number of bits stored is worth making in order to avoid the memory overhead that results from storing a higher amount of bits.

Aspects of the present disclosure may include a number of benefits or advantages. For instance, aspects presented herein may improve the speed and the power efficiency of the tree traversal operations at the core of ray tracing algorithms by skipping redundant invocations of the RTU. Moreover, aspects of the present disclosure may reduce the amount of memory utilized for tree traversal operations in ray tracing. In order to minimize the amount of memory overhead, aspects presented herein may utilize a compression scheme for the floating point $t_{hit}$ values and node IDs. For instance, aspects presented herein may compress the $t_{hit}$ values for a set of hit child nodes, such that the compression of the $t_{hit}$ values for the hit child nodes may reduce an amount of floating point bits that represent the $t_{hit}$ values. This compression may achieve a certain reduction in memory overhead (e.g., a 50% reduction in memory overhead) at a minimum performance penalty cost (e.g., a 2% performance penalty cost). Accordingly, there may be a limited number of redundant node fetches that impact the performance of the ray tracing procedure.

Figure 12:
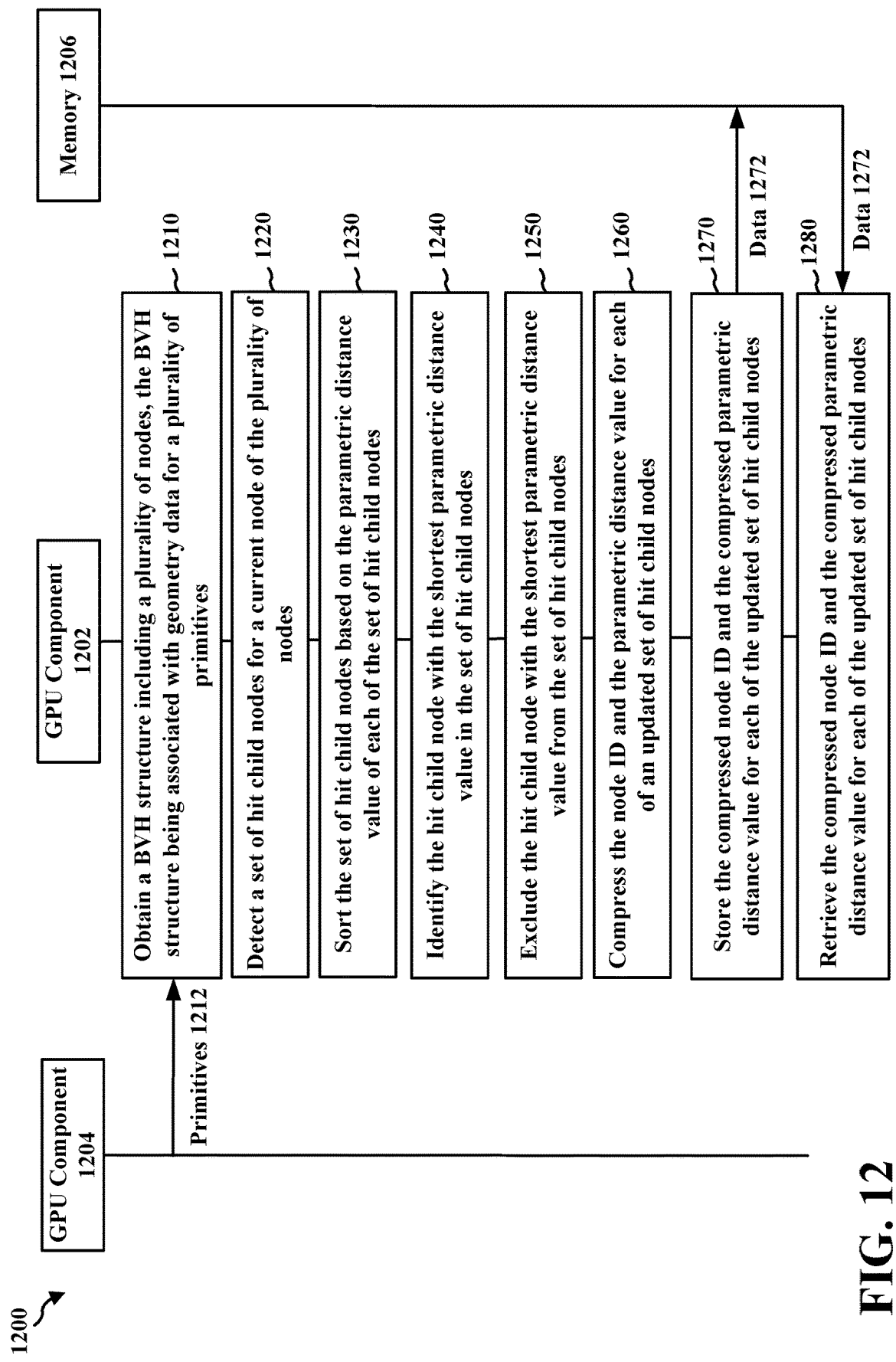
FIG. 12 is a communication flow diagram illustrating example communications between GPU components.

FIG. 12 is a communication flow diagram 1200 of graphics processing in accordance with one or more techniques of this disclosure. As shown in FIG. 12, diagram 1200 includes example communications between components of a GPU (or other graphics processor), e.g., GPU component 1202, GPU component 1204, and memory 1206 (e.g., a stack or cache), in accordance with one or more techniques of this disclosure.

At 1210, GPU component 1202 may obtain a bounding volume hierarchy (BVH) structure including a plurality of nodes, the BVH structure being associated with geometry data for a plurality of primitives in a scene (e.g., primitives 1212 from GPU component 1204), each of the plurality of nodes being associated with one or more primitives of the plurality of primitives, each of the plurality of nodes being associated with a node identifier (ID). The BVH structure may include a plurality of levels such that each of the plurality of levels may include at least one node of the plurality of nodes.

At 1220, GPU component 1202 may detect a set of hit child nodes for a current node of the plurality of nodes, each of the set of hit child nodes being intersected by a current ray from a ray tracing process for the current node, each of the set of hit child nodes including a node ID and a parametric distance value. The parametric distance value for each of the set of hit child nodes may be a $h_{hit}$ value. The set of hit child nodes for the current node may be detected by a ray tracing unit (RTU) in a graphics processing unit (GPU). The node ID for each of the set of hit child nodes may be based on the node ID for the current node. The ray tracing process for the current node may include a plurality of rays, where the current ray is included in the plurality of rays.

At 1230, GPU component 1202 may sort the set of hit child nodes based on the parametric distance value of each of the set of hit child nodes. The set of hit child nodes may be sorted in an ascending order of the parametric distance value of each of the set of hit child nodes or a descending order of the parametric distance value of each of the set of hit child nodes.

At 1240, GPU component 1202 may identify the hit child node with the shortest parametric distance value in the set of hit child nodes.

At 1250, GPU component 1202 may exclude the hit child node with the shortest parametric distance value from the set of hit child nodes based on the identification of the hit child node with the shortest parametric distance value.

At 1260, GPU component 1202 may compress the node ID and the parametric distance value for each of an updated set of hit child nodes based on the sorted set of hit child nodes, the updated set of hit child nodes excluding the hit child node with a shortest parametric distance value in the set of hit child nodes. In some aspects, the compression of the parametric distance value for each of the updated set of hit child nodes may reduce an amount of floating point bits that represent the parametric distance value for each of the updated set of hit child nodes. Also, the compression of the parametric distance value for each of the updated set of hit child nodes may discard a sign bit associated with the amount of floating point bits that represent the parametric distance value for each of the updated set of hit child nodes. The node ID and the parametric distance value for each of the updated set of hit child nodes may be compressed to a size that is a non-integer number of bytes.

At 1270, GPU component 1202 may store the compressed node ID and the compressed parametric distance value for each of the updated set of hit child nodes (e.g., store data 1272 in memory 1206). The compressed node ID and the compressed parametric distance value for each of the updated set of hit child nodes may be stored as a stack entry in a stack. Also, the stack may be located in at least one of: an on-chip memory, a system memory, a graphics memory (GMEM), or a register file on a graphics processing unit (GPU). The compressed parametric distance value for each of the updated set of hit child nodes may be stored as a number of bytes that is a non-multiple of eight (8).

At 1280, GPU component 1202 may retrieve the compressed node ID and the compressed parametric distance value for each of the updated set of hit child nodes (e.g., retrieve data 1272 from memory 1206) after the compressed node ID and the compressed parametric distance value for each of the updated set of hit child nodes are stored. In some aspects, GPU component 1202 may decompress the node ID and the parametric distance value for each of the updated set of hit child nodes. For instance, retrieving the compressed node ID and the compressed parametric distance value for each of the updated set of hit child nodes may further include decompressing the node ID and the parametric distance value for each of the updated set of hit child nodes.

Figure 13:
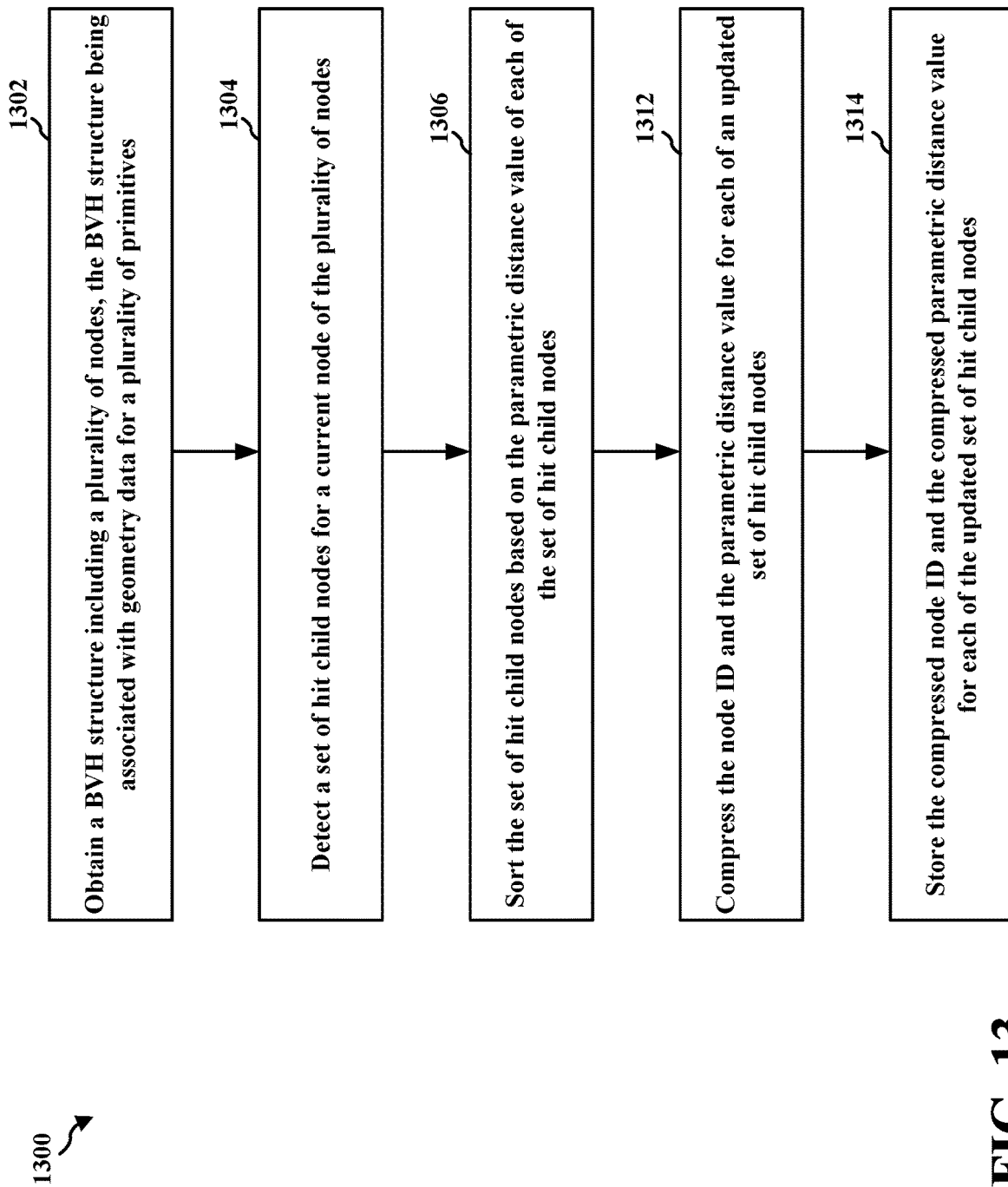
FIG. 13 is a flowchart of an example method of graphics processing.

FIG. 13 is a flowchart 1300 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1302, the GPU may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID), as described in connection with the examples in FIGS. 1-12. For example, as described in 1210 of FIG. 12, GPU component 1202 may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). Further, step 1302 may be performed by processing unit 120 in FIG. 1. The BVH structure may include a plurality of levels such that each of the plurality of levels may include at least one node of the plurality of nodes.

At 1304, the GPU may detect a set of hit child nodes for a current node of the plurality of nodes, each of the set of hit child nodes being intersected by a current ray from a ray tracing process for the current node, each of the set of hit child nodes including a node ID and a parametric distance value, as described in connection with the examples in FIGS. 1-12. For example, as described in 1220 of FIG. 12, GPU component 1202 may detect a set of hit child nodes for a current node of the plurality of nodes, each of the set of hit child nodes being intersected by a current ray from a ray tracing process for the current node, each of the set of hit child nodes including a node ID and a parametric distance value. Further, step 1304 may be performed by processing unit 120 in FIG. 1. The parametric distance value for each of the set of hit child nodes may be a $h_{hit}$ value. The set of hit child nodes for the current node may be detected by a ray tracing unit (RTU) in a graphics processing unit (GPU). The node ID for each of the set of hit child nodes may be based on the node ID for the current node. The ray tracing process for the current node may include a plurality of rays, where the current ray is included in the plurality of rays.

At 1306, the GPU may sort the set of hit child nodes based on the parametric distance value of each of the set of hit child nodes, as described in connection with the examples in FIGS. 1-12. For example, as described in 1230 of FIG. 12, GPU component 1202 may sort the set of hit child nodes based on the parametric distance value of each of the set of hit child nodes. Further, step 1306 may be performed by processing unit 120 in FIG. 1. The set of hit child nodes may be sorted in an ascending order of the parametric distance value of each of the set of hit child nodes or a descending order of the parametric distance value of each of the set of hit child nodes.

At 1312, the GPU may compress the node ID and the parametric distance value for each of an updated set of hit child nodes based on the sorted set of hit child nodes, the updated set of hit child nodes excluding the hit child node with a shortest parametric distance value in the set of hit child nodes, as described in connection with the examples in FIGS. 1-12. For example, as described in 1260 of FIG. 12, GPU component 1202 may compress the node ID and the parametric distance value for each of an updated set of hit child nodes based on the sorted set of hit child nodes, the updated set of hit child nodes excluding the hit child node with a shortest parametric distance value in the set of hit child nodes. Further, step 1312 may be performed by processing unit 120 in FIG. 1. In some aspects, the compression of the parametric distance value for each of the updated set of hit child nodes may reduce an amount of floating point bits that represent the parametric distance value for each of the updated set of hit child nodes. Also, the compression of the parametric distance value for each of the updated set of hit child nodes may discard a sign bit associated with the amount of floating point bits that represent the parametric distance value for each of the updated set of hit child nodes. The node ID and the parametric distance value for each of the updated set of hit child nodes may be compressed to a size that is a non-integer number of bytes.

At 1314, the GPU may store the compressed node ID and the compressed parametric distance value for each of the updated set of hit child nodes, as described in connection with the examples in FIGS. 1-12. For example, as described in 1270 of FIG. 12, GPU component 1202 may store the compressed node ID and the compressed parametric distance value for each of the updated set of hit child nodes. Further, step 1314 may be performed by processing unit 120 in FIG. 1. The compressed node ID and the compressed parametric distance value for each of the updated set of hit child nodes may be stored as a stack entry in a stack. Also, the stack may be located in at least one of: an on-chip memory, a system memory, a graphics memory (GMEM), or a register file on a graphics processing unit (GPU). The compressed parametric distance value for each of the updated set of hit child nodes may be stored as a number of bytes that is a non-multiple of eight (8).

Figure 14:
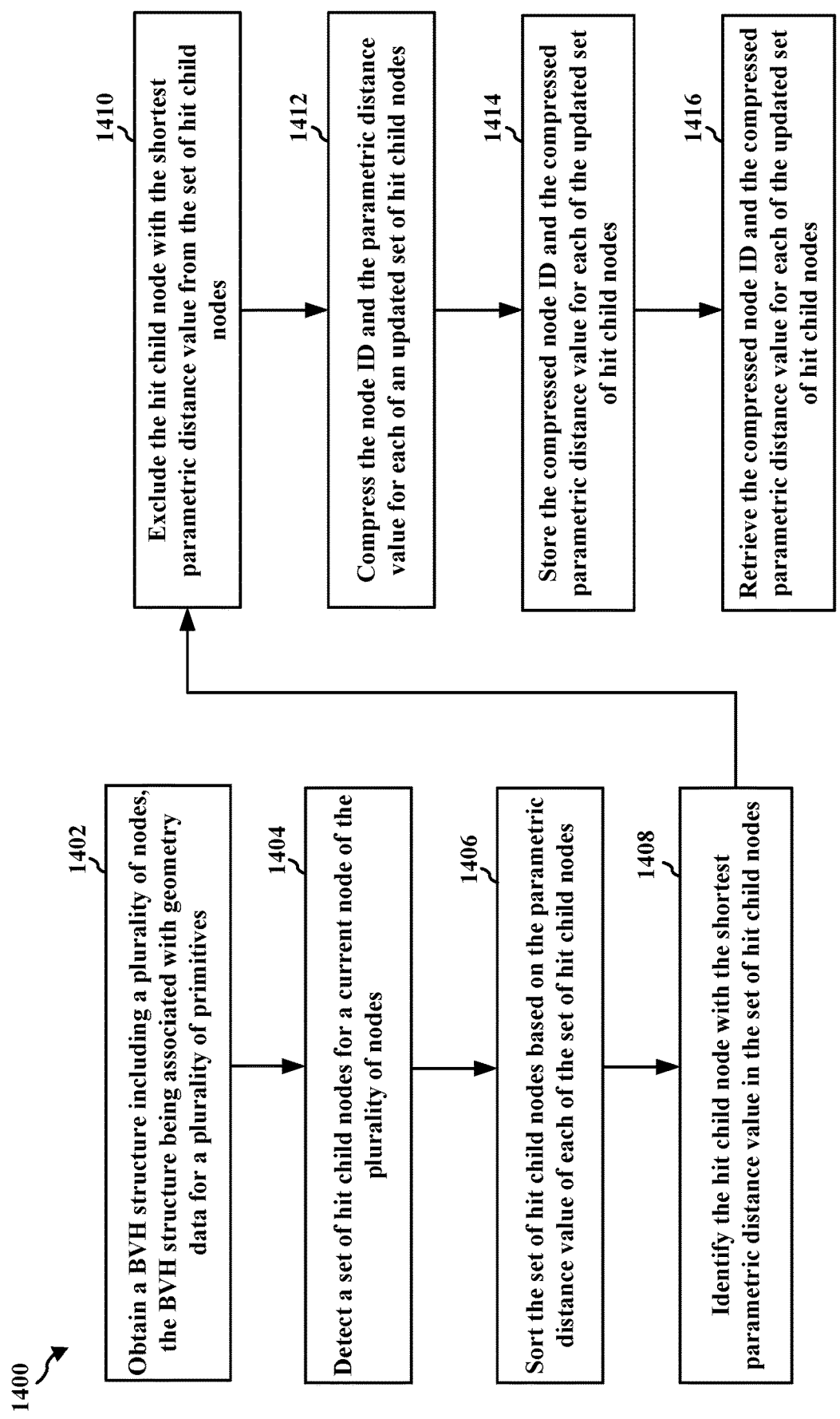
FIG. 14 is a flowchart of an example method of graphics processing.

FIG. 14 is a flowchart 1400 of an example method of graphics processing in accordance with one or more techniques of this disclosure. The method may be performed by a GPU, such as an apparatus for graphics processing, a graphics processor, a CPU, a wireless communication device, and/or any apparatus that may perform graphics processing as used in connection with the examples of FIGS. 1-12. The methods described herein may provide a number of benefits, such as improving resource utilization and/or power savings.

At 1402, the GPU may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID), as described in connection with the examples in FIGS. 1-12. For example, as described in 1210 of FIG. 12, GPU component 1202 may obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). Further, step 1402 may be performed by processing unit 120 in FIG. 1. The BVH structure may include a plurality of levels such that each of the plurality of levels may include at least one node of the plurality of nodes.

At 1404, the GPU may detect a set of hit child nodes for a current node of the plurality of nodes, each of the set of hit child nodes being intersected by a current ray from a ray tracing process for the current node, each of the set of hit child nodes including a node ID and a parametric distance value, as described in connection with the examples in FIGS. 1-12. For example, as described in 1220 of FIG. 12, GPU component 1202 may detect a set of hit child nodes for a current node of the plurality of nodes, each of the set of hit child nodes being intersected by a current ray from a ray tracing process for the current node, each of the set of hit child nodes including a node ID and a parametric distance value. Further, step 1404 may be performed by processing unit 120 in FIG. 1. The parametric distance value for each of the set of hit child nodes may be a $h_{hit}$ value. The set of hit child nodes for the current node may be detected by a ray tracing unit (RTU) in a graphics processing unit (GPU). The node ID for each of the set of hit child nodes may be based on the node ID for the current node. The ray tracing process for the current node may include a plurality of rays, where the current ray is included in the plurality of rays.

At 1406, the GPU may sort the set of hit child nodes based on the parametric distance value of each of the set of hit child nodes, as described in connection with the examples in FIGS. 1-12. For example, as described in 1230 of FIG. 12, GPU component 1202 may sort the set of hit child nodes based on the parametric distance value of each of the set of hit child nodes. Further, step 1406 may be performed by processing unit 120 in FIG. 1. The set of hit child nodes may be sorted in an ascending order of the parametric distance value of each of the set of hit child nodes or a descending order of the parametric distance value of each of the set of hit child nodes.

At 1408, the GPU may identify the hit child node with the shortest parametric distance value in the set of hit child nodes, as described in connection with the examples in FIGS. 1-12. For example, as described in 1240 of FIG. 12, GPU component 1202 may identify the hit child node with the shortest parametric distance value in the set of hit child nodes. Further, step 1408 may be performed by processing unit 120 in FIG. 1.

At 1410, the GPU may exclude the hit child node with the shortest parametric distance value from the set of hit child nodes based on the identification of the hit child node with the shortest parametric distance value, as described in connection with the examples in FIGS. 1-12. For example, as described in 1250 of FIG. 12, GPU component 1202 may exclude the hit child node with the shortest parametric distance value from the set of hit child nodes based on the identification of the hit child node with the shortest parametric distance value. Further, step 1410 may be performed by processing unit 120 in FIG. 1.

At 1412, the GPU may compress the node ID and the parametric distance value for each of an updated set of hit child nodes based on the sorted set of hit child nodes, the updated set of hit child nodes excluding the hit child node with a shortest parametric distance value in the set of hit child nodes, as described in connection with the examples in FIGS. 1-12. For example, as described in 1260 of FIG. 12, GPU component 1202 may compress the node ID and the parametric distance value for each of an updated set of hit child nodes based on the sorted set of hit child nodes, the updated set of hit child nodes excluding the hit child node with a shortest parametric distance value in the set of hit child nodes. Further, step 1412 may be performed by processing unit 120 in FIG. 1. In some aspects, the compression of the parametric distance value for each of the updated set of hit child nodes may reduce an amount of floating point bits that represent the parametric distance value for each of the updated set of hit child nodes. Also, the compression of the parametric distance value for each of the updated set of hit child nodes may discard a sign bit associated with the amount of floating point bits that represent the parametric distance value for each of the updated set of hit child nodes. The node ID and the parametric distance value for each of the updated set of hit child nodes may be compressed to a size that is a non-integer number of bytes.

At 1414, the GPU may store the compressed node ID and the compressed parametric distance value for each of the updated set of hit child nodes, as described in connection with the examples in FIGS. 1-12. For example, as described in 1270 of FIG. 12, GPU component 1202 may store the compressed node ID and the compressed parametric distance value for each of the updated set of hit child nodes. Further, step 1414 may be performed by processing unit 120 in FIG. 1. The compressed node ID and the compressed parametric distance value for each of the updated set of hit child nodes may be stored as a stack entry in a stack. Also, the stack may be located in at least one of: an on-chip memory, a system memory, a graphics memory (GMEM), or a register file on a graphics processing unit (GPU). The compressed parametric distance value for each of the updated set of hit child nodes may be stored as a number of bytes that is a non-multiple of eight (8).

At 1416, the GPU may retrieve the compressed node ID and the compressed parametric distance value for each of the updated set of hit child nodes after the compressed node ID and the compressed parametric distance value for each of the updated set of hit child nodes are stored, as described in connection with the examples in FIGS. 1-12. For example, as described in 1280 of FIG. 12, GPU component 1202 may retrieve the compressed node ID and the compressed parametric distance value for each of the updated set of hit child nodes after the compressed node ID and the compressed parametric distance value for each of the updated set of hit child nodes are stored. Further, step 1416 may be performed by processing unit 120 in FIG. 1. In some aspects, the GPU may decompress the node ID and the parametric distance value for each of the updated set of hit child nodes. For instance, retrieving the compressed node ID and the compressed parametric distance value for each of the updated set of hit child nodes may further include decompressing the node ID and the parametric distance value for each of the updated set of hit child nodes.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for obtaining a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID). The apparatus, e.g., processing unit 120, may also include means for detecting a set of hit child nodes for a current node of the plurality of nodes, each of the set of hit child nodes being intersected by a current ray from a ray tracing process for the current node, each of the set of hit child nodes including a node ID and a parametric distance value. The apparatus, e.g., processing unit 120, may also include means for sorting the set of hit child nodes based on the parametric distance value of each of the set of hit child nodes. The apparatus, e.g., processing unit 120, may also include means for compressing the node ID and the parametric distance value for each of an updated set of hit child nodes based on the sorted set of hit child nodes, the updated set of hit child nodes excluding the hit child node with a shortest parametric distance value in the set of hit child nodes. The apparatus, e.g., processing unit 120, may also include means for storing the compressed node ID and the compressed parametric distance value for each of the updated set of hit child nodes. The apparatus, e.g., processing unit 120, may also include means for identifying the hit child node with the shortest parametric distance value in the set of hit child nodes. The apparatus, e.g., processing unit 120, may also include means for excluding the hit child node with the shortest parametric distance value from the set of hit child nodes based on the identification of the hit child node with the shortest parametric distance value. The apparatus, e.g., processing unit 120, may also include means for retrieving the compressed node ID and the compressed parametric distance value for each of the updated set of hit child nodes after the compressed node ID and the compressed parametric distance value for each of the updated set of hit child nodes are stored.

The subject matter described herein may be implemented to realize one or more benefits or advantages. For instance, the described graphics processing techniques may be used by a GPU, a graphics processor, or some other processor that may perform graphics processing to implement the compressed $t_{hit}$ stack techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize compressed $t_{hit}$ stack techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID); detect a set of hit child nodes for a current node of the plurality of nodes, each of the set of hit child nodes being intersected by a current ray from a ray tracing process for the current node, each of the set of hit child nodes including a node ID and a parametric distance value; sort the set of hit child nodes based on the parametric distance value of each of the set of hit child nodes; compress the node ID and the parametric distance value for each of an updated set of hit child nodes based on the sorted set of hit child nodes, the updated set of hit child nodes excluding the hit child node with a shortest parametric distance value in the set of hit child nodes; and store the compressed node ID and the compressed parametric distance value for each of the updated set of hit child nodes.

Aspect 2 is the apparatus of aspect 1, where the compression of the parametric distance value for each of the updated set of hit child nodes reduces an amount of floating point bits that represent the parametric distance value for each of the updated set of hit child nodes.

Aspect 3 is the apparatus of any of aspects 1 and 2, where the compression of the parametric distance value for each of the updated set of hit child nodes discards a sign bit associated with the amount of floating point bits that represent the parametric distance value for each of the updated set of hit child nodes.

Aspect 4 is the apparatus of any of aspects 1 to 3, where the at least one processor is further configured to: identify the hit child node with the shortest parametric distance value in the set of hit child nodes.

Aspect 5 is the apparatus of any of aspects 1 to 4, where the at least one processor is further configured to: exclude the hit child node with the shortest parametric distance value from the set of hit child nodes based on the identification of the hit child node with the shortest parametric distance value.

Aspect 6 is the apparatus of any of aspects 1 to 5, where the parametric distance value for each of the set of hit child nodes is a $t_{hit}$ value.

Aspect 7 is the apparatus of any of aspects 1 to 6, where the set of hit child nodes is sorted in an ascending order of the parametric distance value of each of the set of hit child nodes or a descending order of the parametric distance value of each of the set of hit child nodes.

Aspect 8 is the apparatus of any of aspects 1 to 7, where the node ID and the parametric distance value for each of the updated set of hit child nodes are compressed to a size that is a non-integer number of bytes.

Aspect 9 is the apparatus of any of aspects 1 to 8, where the at least one processor is further configured to: retrieve the compressed node ID and the compressed parametric distance value for each of the updated set of hit child nodes after the compressed node ID and the compressed parametric distance value for each of the updated set of hit child nodes are stored.

Aspect 10 is the apparatus of any of aspects 1 to 9, where to retrieve the compressed node ID and the compressed parametric distance value for each of the updated set of hit child nodes, the at least one processor is configured to: decompress the node ID and the parametric distance value for each of the updated set of hit child nodes.

Aspect 11 is the apparatus of any of aspects 1 to 10, where the compressed node ID and the compressed parametric distance value for each of the updated set of hit child nodes are stored as a stack entry in a stack.

Aspect 12 is the apparatus of any of aspects 1 to 11, where the stack is located in at least one of: an on-chip memory, a system memory, a graphics memory (GMEM), or a register file on a graphics processing unit (GPU).

Aspect 13 is the apparatus of any of aspects 1 to 12, where the set of hit child nodes for the current node is detected by a ray tracing unit (RTU) in a graphics processing unit (GPU).

Aspect 14 is the apparatus of any of aspects 1 to 13, where the compressed parametric distance value for each of the updated set of hit child nodes is stored as a number of bytes that is a non-multiple of eight (8).

Aspect 15 is the apparatus of any of aspects 1 to 14, where the node ID for each of the set of hit child nodes is based on the node ID for the current node.

Aspect 16 is the apparatus of any of aspects 1 to 15, where the ray tracing process for the current node includes a plurality of rays, where the current ray is included in the plurality of rays.

Aspect 17 is the apparatus of any of aspects 1 to 16, where the BVH structure includes a plurality of levels such that each of the plurality of levels includes at least one node of the plurality of nodes.

Aspect 18 is the apparatus of any of aspects 1 to 17, where the apparatus is a wireless communication device, further including at least one of an antenna or a transceiver coupled to the at least one processor.

Aspect 19 is a method of graphics processing for implementing any of aspects 1 to 18.

Aspect 20 is an apparatus for graphics processing including means for implementing any of aspects 1 to 18.

Aspect 21 is a non-transitory computer-readable medium storing computer executable code, the code when executed by at least one processor causes the at least one processor to implement any of aspects 1 to 18.

What is claimed is:

1. An apparatus for graphics processing, comprising:
a memory; and
at least one processor coupled to the memory and configured to:
obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
detect a set of hit child nodes for a current node of the plurality of nodes, each of the set of hit child nodes being intersected by a current ray from a ray tracing process for the current node, each of the set of hit child nodes including a node ID and a parametric distance value;
sort the set of hit child nodes based on the parametric distance value of each of the set of hit child nodes;
compress the node ID and the parametric distance value for each of an updated set of hit child nodes based on the sorted set of hit child nodes, the updated set of hit child nodes excluding a hit child node with a shortest parametric distance value in the set of hit child nodes; and
store the compressed node ID and the compressed parametric distance value for each of the updated set of hit child nodes.

2. The apparatus of claim 1, wherein the compression of the parametric distance value for each of the updated set of hit child nodes reduces an amount of floating point bits that represent the parametric distance value for each of the updated set of hit child nodes.

3. The apparatus of claim 2, wherein the compression of the parametric distance value for each of the updated set of hit child nodes discards a sign bit associated with the amount of the floating point bits that represent the parametric distance value for each of the updated set of hit child nodes.

4. The apparatus of claim 1, wherein the at least one processor is further configured to:
identify the hit child node with the shortest parametric distance value in the set of hit child nodes.

5. The apparatus of claim 4, wherein the at least one processor is further configured to:
exclude the hit child node with the shortest parametric distance value from the set of hit child nodes based on the identification of the hit child node with the shortest parametric distance value.

6. The apparatus of claim 1, wherein the parametric distance value for each of the set of hit child nodes is a $t_{hit}$ value.

7. The apparatus of claim 1, wherein the set of hit child nodes is sorted in an ascending order of the parametric distance value of each of the set of hit child nodes or a descending order of the parametric distance value of each of the set of hit child nodes.

8. The apparatus of claim 1, wherein the node ID and the parametric distance value for each of the updated set of hit child nodes are compressed to a size that is a non-integer number of bytes.

9. The apparatus of claim 1, wherein the at least one processor is further configured to:
retrieve the compressed node ID and the compressed parametric distance value for each of the updated set of hit child nodes after the compressed node ID and the compressed parametric distance value for each of the updated set of hit child nodes are stored.

10. The apparatus of claim 9, wherein to retrieve the compressed node ID and the compressed parametric distance value for each of the updated set of hit child nodes, the at least one processor is configured to: decompress the node ID and the parametric distance value for each of the updated set of hit child nodes.

11. The apparatus of claim 1, wherein the compressed node ID and the compressed parametric distance value for each of the updated set of hit child nodes are stored as a stack entry in a stack.

12. The apparatus of claim 11, wherein the stack is located in at least one of: an on-chip memory, a system memory, a graphics memory (GMEM), or a register file on a graphics processing unit (GPU).

13. The apparatus of claim 1, wherein the set of hit child nodes for the current node is detected by a ray tracing unit (RTU) in a graphics processing unit (GPU).

14. The apparatus of claim 1, wherein the compressed parametric distance value for each of the updated set of hit child nodes is stored as a number of bytes that is a non-multiple of eight (8).

15. The apparatus of claim 1, wherein the node ID for each of the set of hit child nodes is based on the node ID for the current node.

16. The apparatus of claim 1, wherein the ray tracing process for the current node includes a plurality of rays, wherein the current ray is included in the plurality of rays.

17. The apparatus of claim 1, wherein the BVH structure includes a plurality of levels such that each of the plurality of levels includes at least one node of the plurality of nodes.

18. The apparatus of claim 1, wherein the apparatus is a wireless communication device, further comprising at least one of an antenna or a transceiver coupled to the at least one processor.

19. A method of graphics processing, comprising:
obtaining a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
detecting a set of hit child nodes for a current node of the plurality of nodes, each of the set of hit child nodes being intersected by a current ray from a ray tracing process for the current node, each of the set of hit child nodes including a node ID and a parametric distance value;
sorting the set of hit child nodes based on the parametric distance value of each of the set of hit child nodes;
compressing the node ID and the parametric distance value for each of an updated set of hit child nodes based on the sorted set of hit child nodes, the updated set of hit child nodes excluding a hit child node with a shortest parametric distance value in the set of hit child nodes; and
storing the compressed node ID and the compressed parametric distance value for each of the updated set of hit child nodes.

20. The method of claim 19, wherein the compression of the parametric distance value for each of the updated set of hit child nodes reduces an amount of floating point bits that represent the parametric distance value for each of the updated set of hit child nodes,
wherein the compression of the parametric distance value for each of the updated set of hit child nodes discards a sign bit associated with the amount of the floating point bits that represent the parametric distance value for each of the updated set of hit child nodes.

21. The method of claim 19, further comprising:
identifying the hit child node with the shortest parametric distance value in the set of hit child nodes; and
excluding the hit child node with the shortest parametric distance value from the set of hit child nodes based on the identification of the hit child node with the shortest parametric distance value.

22. The method of claim 19, wherein the parametric distance value for each of the set of hit child nodes is a $t_{hit}$ value.

23. The method of claim 19, wherein the set of hit child nodes is sorted in an ascending order of the parametric distance value of each of the set of hit child nodes or a descending order of the parametric distance value of each of the set of hit child nodes.

24. The method of claim 19, wherein the node ID and the parametric distance value for each of the updated set of hit child nodes are compressed to a size that is a non-integer number of bytes.

25. The method of claim 19, further comprising:
retrieving the compressed node ID and the compressed parametric distance value for each of the updated set of hit child nodes after the compressed node ID and the compressed parametric distance value for each of the updated set of hit child nodes are stored.

26. The method of claim 25, wherein retrieving the compressed node ID and the compressed parametric distance value for each of the updated set of hit child nodes further comprises decompressing the node ID and the parametric distance value for each of the updated set of hit child nodes.

27. The method of claim 19, wherein the compressed node ID and the compressed parametric distance value for each of the updated set of hit child nodes are stored as a stack entry in a stack, wherein the stack is located in at least one of: an on-chip memory, a system memory, a graphics memory (GMEM), or a register file on a graphics processing unit (GPU).

28. The method of claim 19, wherein at least one of: the set of hit child nodes for the current node is detected by a ray tracing unit (RTU) in a graphics processing unit (GPU); the compressed parametric distance value for each of the updated set of hit child nodes is stored as a number of bytes that is a non-multiple of eight (8); the node ID for each of the set of hit child nodes is based on the node ID for the current node; the ray tracing process for the current node includes a plurality of rays and the current ray is included in the plurality of rays; or the BVH structure includes a plurality of levels such that each of the plurality of levels includes at least one node of the plurality of nodes.

29. An apparatus for graphics processing, comprising:
- means for obtaining a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
- means for detecting a set of hit child nodes for a current node of the plurality of nodes, each of the set of hit child nodes being intersected by a current ray from a ray tracing process for the current node, each of the set of hit child nodes including a node ID and a parametric distance value;
- means for sorting the set of hit child nodes based on the parametric distance value of each of the set of hit child nodes;
- means for compressing the node ID and the parametric distance value for each of an updated set of hit child nodes based on the sorted set of hit child nodes, the updated set of hit child nodes excluding a hit child node with a shortest parametric distance value in the set of hit child nodes; and
- means for storing the compressed node ID and the compressed parametric distance value for each of the updated set of hit child nodes.

30. A non-transitory computer-readable medium storing computer executable code for graphics processing, the code when executed by a processor causes the processor to:
- obtain a bounding volume hierarchy (BVH) structure including a plurality of nodes, the BVH structure being associated with geometry data for a plurality of primitives in a scene, each of the plurality of nodes being associated with one or more primitives of the plurality of primitives, each of the plurality of nodes being associated with a node identifier (ID);
- detect a set of hit child nodes for a current node of the plurality of nodes, each of the set of hit child nodes being intersected by a current ray from a ray tracing process for the current node, each of the set of hit child nodes including a node ID and a parametric distance value;
- sort the set of hit child nodes based on the parametric distance value of each of the set of hit child nodes;
- compress the node ID and the parametric distance value for each of an updated set of hit child nodes based on the sorted set of hit child nodes, the updated set of hit child nodes excluding a hit child node with a shortest parametric distance value in the set of hit child nodes; and
- store the compressed node ID and the compressed parametric distance value for each of the updated set of hit child nodes.

* * * * *